(12) United States Patent
Kim et al.

(10) Patent No.: US 11,412,497 B2
(45) Date of Patent: Aug. 9, 2022

(54) METHOD AND APPARATUS FOR TRANSMITTING OR RECEIVING UPLINK FEEDBACK INFORMATION IN COMMUNICATION SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Jae Heung Kim, Daejeon (KR); Sung Hyun Moon, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 16/831,151

(22) Filed: Mar. 26, 2020

(65) Prior Publication Data
US 2020/0314815 A1   Oct. 1, 2020

(30) Foreign Application Priority Data

Mar. 27, 2019   (KR) ........................ 10-2019-0035375
Jul. 5, 2019   (KR) ........................ 10-2019-0081512
(Continued)

(51) Int. Cl.
*H04W 72/04* (2009.01)
*H04L 1/18* (2006.01)

(52) U.S. Cl.
CPC ......... *H04W 72/042* (2013.01); *H04L 1/1812* (2013.01); *H04W 72/0413* (2013.01)

(58) Field of Classification Search
CPC ....... H04L 1/18; H04L 1/1812; H04L 1/1864; H04L 1/1896; H04L 5/0053; H04L 5/0055; H04W 72/0413; H04W 72/042
See application file for complete search history.

(56) References Cited

U.S. PATENT DOCUMENTS 10,686,562 B2 *   6/2020   Xiao .................... H04L 1/1812
10,999,864 B2 *   5/2021   Zhang .................. H04L 1/1864
(Continued)

FOREIGN PATENT DOCUMENTS

CN   112929138 A   *   6/2021
EP    3319385 A1       5/2018
(Continued)

OTHER PUBLICATIONS

Samsung, Discussion on HARQ-ACK codebook for NR-U, Jan. 21, 2019, 3GPP TSG RAN WG1 Ad-Hoc Meeting 1901, Taipei, Taiwan, Tdoc: R1-1901039 (Year: 2019).*
(Continued)

*Primary Examiner* — Eric Nowlin
(74) *Attorney, Agent, or Firm* — Rabin & Berdo, P.C.

(57) ABSTRACT

Disclosed are a method and an apparatus for transmitting or receiving uplink feedback information in a communication system. An operation method of a terminal may comprise receiving downlink control information (DCI) from a base station, the DCI including resource allocation information of a physical downlink shared channel (PDSCH); receiving data #n from the base station through the PDSCH indicated by the DCI; generating a hybrid automatic repeat request (HARQ) codebook including an HARQ response bit #n for the data #n and an HARQ response bit #n−1 for data #n−1 received from the base station before the data #n; and transmitting the HARQ codebook to the base station. Therefore, the performance of the communication system can be improved.

18 Claims, 5 Drawing Sheets

(30) Foreign Application Priority Data

| Aug. 23, 2019 | (KR) | .......................... 10-2019-0103578 |
| Nov. 1, 2019 | (KR) | .......................... 10-2019-0138603 |
| Mar. 26, 2020 | (KR) | .......................... 10-2020-0036642 |

(56) References Cited

U.S. PATENT DOCUMENTS

| 11,246,155 | B2* | 2/2022 | Zhang | H04L 1/1864 |
| 2010/0169732 | A1* | 7/2010 | Wu | H04L 1/1822 |
| | | | | 714/748 |
| 2014/0362745 | A1* | 12/2014 | Davydov | H04L 5/14 |
| | | | | 370/280 |
| 2015/0043489 | A1* | 2/2015 | Tseng | H04W 24/02 |
| | | | | 370/329 |
| 2015/0319777 | A1* | 11/2015 | Seo | H04W 76/19 |
| | | | | 370/330 |
| 2016/0099799 | A1* | 4/2016 | Bashar | H04L 5/0007 |
| | | | | 370/280 |
| 2016/0212734 | A1* | 7/2016 | He | H04L 1/1861 |
| 2017/0164352 | A1 | 6/2017 | Yang et al. | |
| 2017/0289995 | A1* | 10/2017 | Lin | H04W 72/0446 |
| 2017/0331670 | A1* | 11/2017 | Parkvall | H04J 11/0079 |
| 2017/0346605 | A1* | 11/2017 | Chendamarai Kannan | ................. |
| | | | | H04L 1/1874 |
| 2018/0220466 | A1 | 8/2018 | Park et al. | |
| 2019/0028242 | A1* | 1/2019 | Xiao | H04L 1/1864 |
| 2019/0053219 | A1 | 2/2019 | Tiirola et al. | |
| 2019/0103943 | A1* | 4/2019 | Wang | H04L 1/1861 |
| 2019/0104552 | A1 | 4/2019 | Hui et al. | |
| 2019/0110307 | A1* | 4/2019 | Kim | H04W 72/1268 |
| 2019/0223255 | A1 | 7/2019 | Jeon et al. | |
| 2019/0239222 | A1 | 8/2019 | Yerramalli et al. | |
| 2019/0239224 | A1 | 8/2019 | Yerramalli et al. | |
| 2020/0092858 | A1* | 3/2020 | Ye | H04L 1/1829 |
| 2020/0344012 | A1* | 10/2020 | Karaki | H04W 72/042 |
| 2020/0374043 | A1* | 11/2020 | Lei | H04W 72/0413 |
| 2021/0084645 | A1* | 3/2021 | Papasakellariou | .......................... |
| | | | | H04W 72/1263 |
| 2021/0135791 | A1* | 5/2021 | Wang | H04L 1/0009 |
| 2021/0143945 | A1* | 5/2021 | Park | H04L 1/1896 |
| 2021/0167900 | A1* | 6/2021 | Karaki | H04W 72/0446 |

FOREIGN PATENT DOCUMENTS

| KR | 20210082648 A | * | 12/2019 | |
| KR | 20200115309 A | * | 3/2020 | |
| WO | 2018/073792 A1 | | 4/2018 | |
| WO | WO-2021033116 A1 | * | 2/2021 | .......... H04L 1/1854 |
| WO | WO-2021091258 A1 | * | 5/2021 | |

OTHER PUBLICATIONS

Samsung, Discussion on HARQ-ACK codebook for NR-U, Feb. 25, 2019, 3GPP TSG RAN WG1 #96, Athens, Greece, Tdoc: R1-1902265 (Year: 2019).*

Interdigital, Inc., On the support of multiple HARQ-ACK codebooks within a slot, Feb. 25, 2019, 3GPP TSG RAN WG1 #96, Athens, Greece, Tdoc: R1-1902607 (Year: 2019).*

Huawei et al., Clarification on HARQ-ACK codebook and PUCCH resource determination, Feb. 25, 2019, 3GPP TSG RAN WG1 #96, Athens, Greece, Tdoc: R1-1903206 (Year: 2019).*

Interdigital, Inc., Enhanced dynamic HARQ codebook for NR-U, Oct. 14, 2019, 3GPP TSG RAN WG1 #98, Chongqing, China, Tdoc: R1-1910941 (Year: 2019).*

Huawei, Feature lead summary#3 of HARQ enhancements for NR-U, Oct. 14, 2019, 3GPP TSG RAN WG1 #98, Chongqing, China, Tdoc: R1-1911697 (Year: 2019).*

Interdigital, Inc., Enhanced dynamic HARQ codebook for NR-U, Nov. 18, 2019, 3GPP TSG RAN WG1 #99, Reno, USA, Tdoc: R1-1912698 (Year: 2019).*

NTT Docomo, Inc., Discussion on the priority index for the HARQ-ACK codebook, Feb. 24, 2020, 3GPP TSG RAN WG1 #100, e-Meeting, Tdoc: R1-2000920 (Year: 2020).*

* cited by examiner

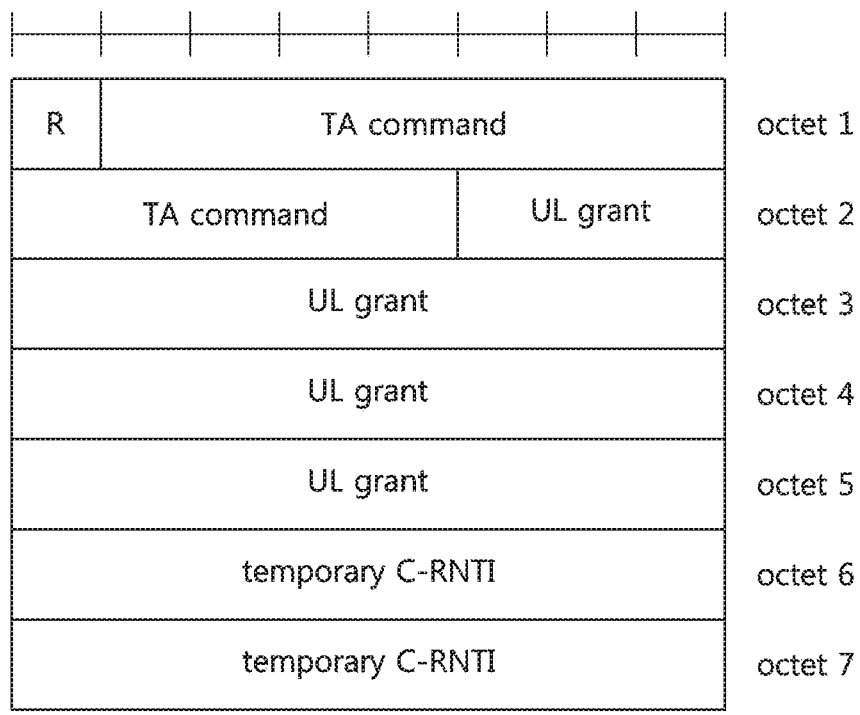

METHOD AND APPARATUS FOR TRANSMITTING OR RECEIVING UPLINK FEEDBACK INFORMATION IN COMMUNICATION SYSTEM

CROSS-REFERENCE TO RELATED APPLICATIONS

This application claims priority to Korean Patent Applications No. 10-2019-0035375 filed on Mar. 27, 2019, No. 10-2019-0081512 filed on Jul. 5, 2019, No. 10-2019-0103578 filed on Aug. 23, 2019, No. 10-2019-0138603 filed on Nov. 1, 2019, and No. 10-2020-0036642 filed on Mar. 26, 2020 with the Korean Intellectual Property Office (KIPO), the entire contents of which are hereby incorporated by reference.

BACKGROUND

1. Technical Field

The present disclosure relates to feedback technologies in a communication system, and more specifically, to techniques for transmitting or receiving uplink feedback information in a shared spectrum.

2. Related Art

The communication system (hereinafter, a New Radio (NR) communication system) using a higher frequency band (e.g., a frequency band of 6 GHz or higher) than a frequency band (e.g., a frequency band of 6 GHz or lower) of the Long Term Evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

Meanwhile, one numerology related to an orthogonal frequency division multiplexing (OFDM) waveform may be used in the LTE communication system, and multiple numerologies related to OFDM waveforms may be used in the NR communication system. A time division duplex (TDD) based communication system may support both the eMBB and the URLLC. In this case, a low latency performance of the URLLC needs to be improved. In a downlink communication procedure, transmission of a hybrid automatic repeat request (HARQ) response for downlink data may be required. Therefore, a transmission delay time in the downlink communication procedure may be determined based on a repetition periodicity of downlink (DL) slot and uplink (UL) slot. In an uplink communication procedure, the base station may transmit a UL grant to the terminal through a DL slot. Therefore, a transmission delay time in the uplink communication procedure may be determined based on a repetition periodicity of DL slot and UL slot.

In the NR communication system, the type of slot may be changed dynamically. The types of slot may be classified into a DL slot, a UL slot, and a flexible (FL) slot. The FL slot may be changed to a DL slot or a UL slot. The terminal may identify the type of the slot in symbol units. In the LTE communication system, the type of subframe may be changed. The type of subframe may be classified into a DL subframe, a UL subframe, and a special subframe.

Meanwhile, in a shared spectrum, the terminal may determine an occupancy state of a channel by performing a listen before talk (LBT) operation, and may transmit uplink feedback information to the base station by using a channel in an idle state. However, when the occupancy state of the channel is in a busy state, the terminal may not transmit uplink feedback information. In this case, since transmission delay of the uplink feedback information occurs, methods for solving this problem are needed.

SUMMARY

Accordingly, exemplary embodiments of the present disclosure provide a method and an apparatus for transmitting or receiving uplink feedback information in a communication system operating in a shared spectrum.

According to a first exemplary embodiment of the present disclosure, an operation method of a terminal in a communication system comprises receiving downlink control information (DCI) from a base station, the DCI including resource allocation information of a physical downlink shared channel (PDSCH); receiving data #n from the base station through the PDSCH indicated by the DCI; generating a hybrid automatic repeat request (HARQ) codebook including an HARQ response bit #n for the data #n and an HARQ response bit #n−1 for data #n−1 received from the base station before the data #n; and transmitting the HARQ codebook to the base station, wherein the HARQ response bit #n and the HARQ response bit #n−1 are arranged in the HARQ codebook in an order of HARQ process numbers, and n is a natural number.

The HARQ codebook may further include a new data indicator (NDI) #n associated with the HARQ response bit #n and an NDI #n−1 associated with the HARQ response bit #n−1.

The HARQ response bit #n may be concatenated with the NDI #n, the HARQ response bit #n−1 may be concatenated with the NDI #n−1, and the concatenated HARQ response bit #n and NDI #n and the concatenated HARQ response bit #n−1 and NDI #n−1 may be arranged in the HARQ codebook in the order of the HARQ process numbers.

The HARQ codebook may include HARQ response bits associated with all HARQ processes configured in the terminal or include the HARQ response bits generated by concatenating in an order of HARQ process identifies and NDIs associated with the HARQ response bits.

The DCI may further include a field indicating whether transmission of the HARQ codebook is triggered.

The HARQ codebook may be transmitted through a physical uplink control channel (PUCCH), and information indicating one or more indices of a resource block (RB) set to which the PUCCH belongs and one or more interlace indices of the PUCCH in the RB set may be received from the base station.

The information indicating the index of the RB set and the interlace index may be received from the base station through a radio resource control (RRC) message.

When a decoding operation for the data #n is not completed, a value of the HARQ response bit #n included in the HARQ codebook may be not configured to be a HARQ response bit for the data #n.

According to a second exemplary embodiment of the present disclosure, an operation method of a base station in a communication system comprises transmitting downlink control information (DCI) to a terminal, the DCI including resource allocation information of a physical downlink shared channel (PDSCH) #n; transmitting the PDSCH #n through resources indicated by the resource allocation information; and receiving a hybrid automatic repeat request (HARQ) codebook including an HARQ response bit #n for the PDSCH #n and an HARQ response bit #n−1 for a PDSCH #n−1, wherein the HARQ response bit #n and the HARQ response bit #n−1 are arranged in the HARQ codebook in an order of the PDSCH #n and the PDSCH #n−1, and n is a natural number.

The PDSCH #n and the PDSCH #n−1 may belong to same PDSCH group.

Each of the PDSCH #n and the PDSCH #n−1 may belong to different PDSCH groups.

The DCI may further includes a field indicating a number of PDSCH groups to be feedbacked, the field set as a first value may indicate feedback of a HARQ response for one PDSCH group, and the field set as a second value may indicate feedback of a HARQ response for a plurality of PDSCH groups.

The HARQ codebook may be received through a physical uplink control channel (PUCCH), and information indicating one or more indices of a resource block (RB) set to which the PUCCH belongs and one or more interlace indices of the PUCCH in the RB set may be transmitted to the terminal through higher layer signaling.

According to a third exemplary embodiment of the present disclosure, a terminal in a communication system comprises a processor; and a memory electronically communicating with the processor and storing instructions executable by the processor, wherein when executed by the processor, the instructions cause the terminal to receive downlink control information (DCI) from a base station, the DCI including resource allocation information of a physical downlink shared channel (PDSCH); receive data #n from the base station through the PDSCH indicated by the DCI; generate a hybrid automatic repeat request (HARQ) codebook including an HARQ response bit #n for the data #n and an HARQ response bit #n−1 for data #n−1 received from the base station before the data #n; and transmit the HARQ codebook to the base station, wherein the HARQ response bit #n and the HARQ response bit #n−1 are arranged in the HARQ codebook in an order of HARQ process numbers, and n is a natural number.

The HARQ codebook may further include a new data indicator (NDI) #n associated with the HARQ response bit #n and an NDI #n−1 associated with the HARQ response bit #n−1.

The HARQ response bit #n may be concatenated with the NDI #n, the HARQ response bit #n−1 may be concatenated with the NDI #n−1, and the concatenated HARQ response bit #n and NDI #n and the concatenated HARQ response bit #n−1 and NDI #n−1 may be arranged in the HARQ codebook in the order of the HARQ process numbers.

The HARQ codebook may include HARQ response bits associated with all HARQ processes configured in the terminal or include the HARQ response bits generated by concatenating in an order of HARQ process identifies and NDIs associated with the HARQ response bits.

The DCI may further includes a field indicating whether transmission of the HARQ codebook is triggered.

The HARQ codebook may be transmitted through a physical uplink control channel (PUCCH), and information indicating one or more indices of a resource block (RB) set to which the PUCCH belongs and one or more interlace indices of the PUCCH in the RB set may be received from the base station.

When a decoding operation for the data #n is not completed, a value of the HARQ response bit #n included in the HARQ codebook may be not configured to be a HARQ response bit for the data #n.

According to the exemplary embodiments of the present disclosure, the terminal can transmit a plurality of hybrid automatic repeat request (HARQ) responses to the base station through one physical uplink control channel (PUCCH). Here, the plurality of HARQ responses may include an HARQ response for a physical downlink shared channel (PDSCH) scheduled by current downlink control information (DCI) and an HARQ response for a PDSCH scheduled by previous DCI. Therefore, in the communication system operating in a shared spectrum, a transmission delay of uplink feedback information can be reduced, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 5 is a conceptual diagram illustrating a first exemplary embodiment of an RAR in a communication system; and FIG. 6 is a conceptual diagram illustrating a first exemplary embodiment of an UL grant included in an RAR in a communication system.

Figure 1:
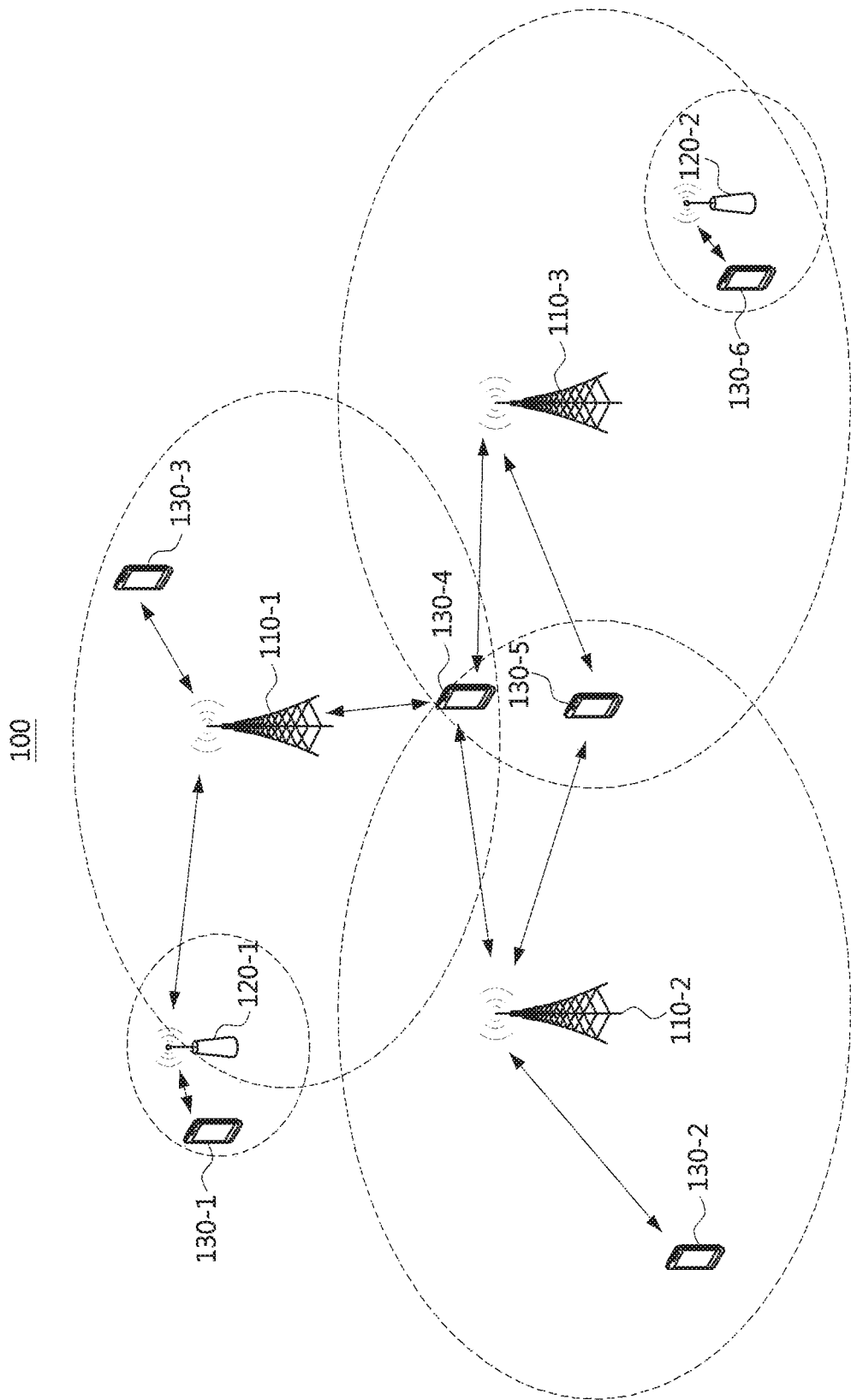
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE) or LTE-Advanced (LTE-A)), 5G communication (e.g., new radio (NR)), or the like as defined in the 3rd generation partnership project (3GPP) technical specification. The 4G communication may be performed in a frequency band of 6 GHz or below, and the 5G communication may be performed in a frequency band of 6 GHz or above as well as the frequency band of 6 GHz or below.

For example, for the 4G and 5G communications, the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, and the like.

In addition, the communication system 100 may further include a core network. When the communication system 100 supports 4G communication, the core network may include a serving-gateway (S-GW), a packet data network (PDN) gateway (P-GW), a mobility management entity (MME), and the like. When the communication system 100 supports 5G communication, the core network may include a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
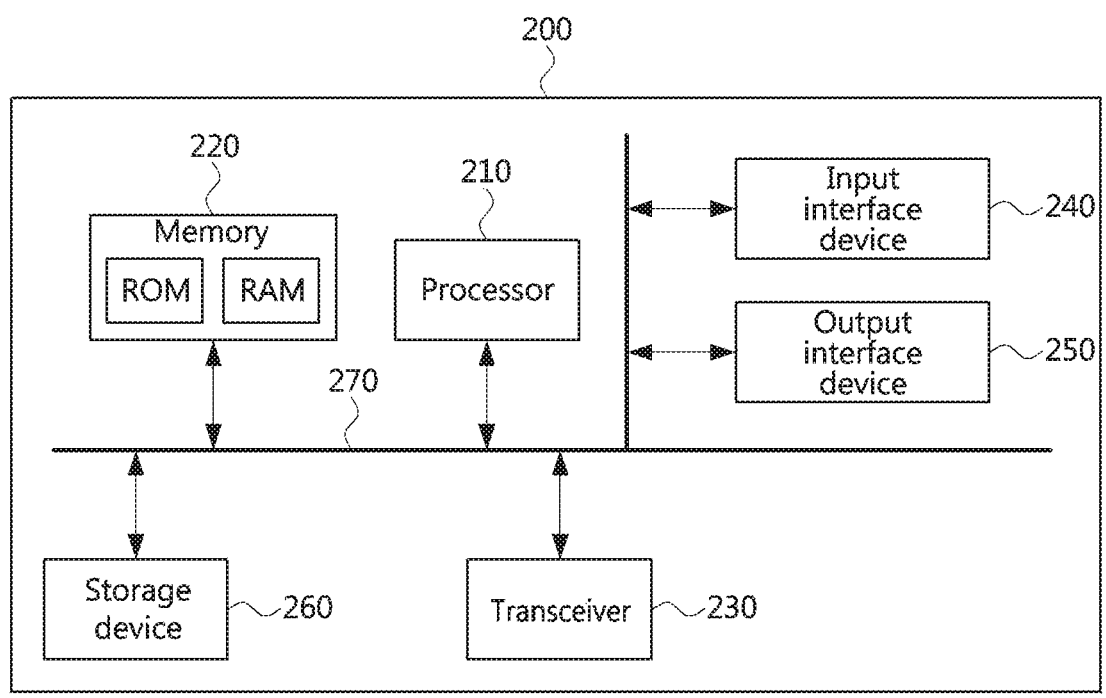
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, the respective components included in the communication node 200 may be connected through a separate interface or a separate bus around the processor 210 instead of the common bus 270. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in a shared spectrum, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting or receiving uplink feedback information in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

The terminal may receive a physical downlink shared channel (PDSCH) from the base station, and may transmit a hybrid automatic repeat request (HARQ) response (e.g., acknowledgment (ACK) or negative ACK (NACK)) for the PDSCH to the base station. The HARQ response may be 'HARQ-ACK' or 'HARQ-ACK bit' defined in the technical specification. Alternatively, the HARQ response may mean a HARQ codebook which is generated based on the HARQ-ACK bit. When the HARQ response received from the terminal is NACK, the base station may retransmit the same transport block (TB). When the HARQ response received from the terminal is ACK, the base station may perform operations for transmission of another TB.

Radio resources used for transmission of the HARQ response may be configured by the base station. For example, the base station may transmit resource configuration information for uplink feedback to the terminal, and the terminal may transmit an HARQ response to the base station using radio resources indicated by the resource configuration information. A method for configuring the resources for uplink feedback may vary according to an operation state of the terminal. The first operation state of the terminal may correspond to a case when the terminal that has not established a radio resource control (RRC) connection with the base station performs an initial access procedure (e.g., a cell search procedure or a random access procedure) or a case when the terminal transmits an HARQ response for a PDSCH in an RRC connection reconfiguration procedure. The second operation state of the terminal may correspond to a case when the terminal operating in an RRC connected state transmits an HARQ response for a PDSCH.

In the first operation state of the terminal, because the RRC connection between the terminal and the base station is not established (e.g., because a specific RRC connection between the terminal and the base station is not assumed), the base station may transmit resource configuration information for uplink feedback to unspecified terminals by using higher layer signaling. In addition, the base station may inform a terminal of a radio resource(s) of a UL control channel to be used by the terminal among the radio resources configured by the higher layer signaling through physical layer signaling.

In the second operation state of the terminal, the base station may inform the corresponding terminal of radio resources of a UL control channel available for the terminal by using higher layer signaling in the RRC connection configuration procedure. In addition, the base station may inform the corresponding terminal of a radio resource(s) of a UL control channel to be used by the terminal among the radio resources configured by the higher layer signaling through physical layer signaling.

Here, the higher layer signaling may mean a procedure of transmitting and receiving an RRC message, medium access control (MAC) layer signaling may mean a procedure of transmitting and receiving a MAC control element (CE), and the physical layer signaling may be a procedure of transmitting and receiving a physical downlink control channel (PDCCH) (e.g., downlink control information (DCI)). In the following exemplary embodiments, a channel (e.g., PDCCH, PDSCH, PUCCH, PUSCH, PSCCH, PSSCH, etc.) may mean 'signal including data and/or control information' or 'radio resource through which data and/or control information is transmitted'. In addition, the signal may be a concept including a channel and a reference signal.

In order to comply with the frequency regulation (e.g., spectrum regulation) in the communication system operating in an unlicensed band, a UL control channel may occupy many frequency resources. Within a bandwidth, one UL control channel may occupy physical resource blocks (PRBs) having a regular interval in the frequency domain.

Figure 3A:
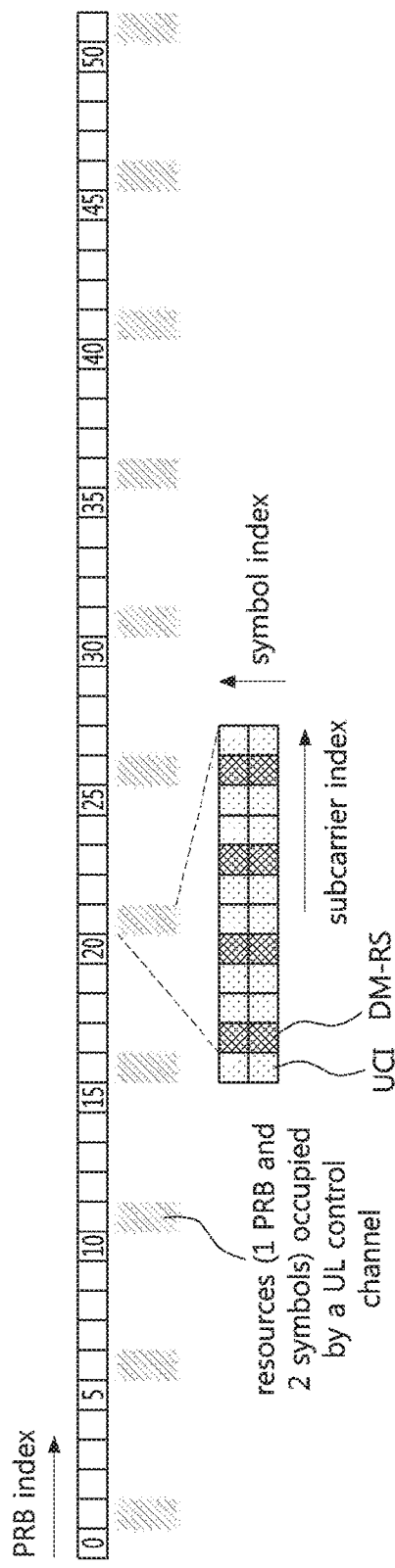
FIG. 3A is a conceptual diagram illustrating a first exemplary embodiment of a method for arranging an UL control channel in a communication system.
Figure 3B:
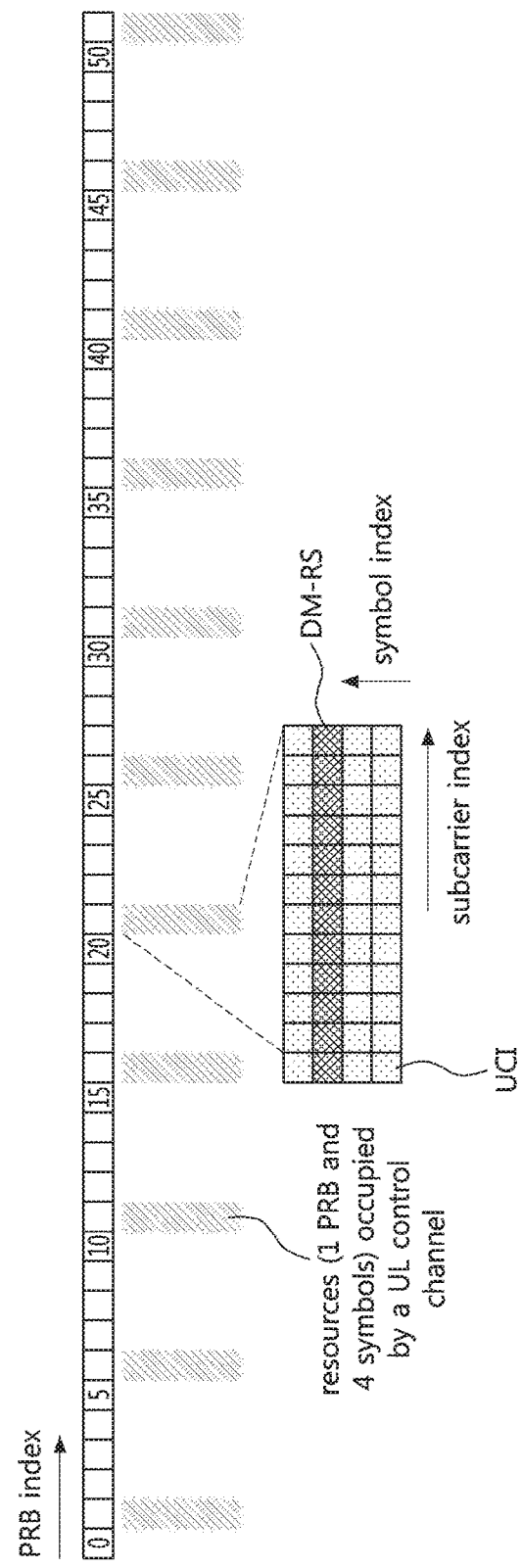
FIG. 3B is a conceptual diagram illustrating a second exemplary embodiment of a method for arranging an UL control channel in a communication system.

FIG. 3A is a conceptual diagram illustrating a first exemplary embodiment of a method for arranging an UL control channel in a communication system, and FIG. 3B is a conceptual diagram illustrating a second exemplary embodiment of a method for arranging an UL control channel in a communication system.

Referring to FIGS. 3A and 3B, a bandwidth of a communication system may be 20 MHz, and a subcarrier spacing thereof may be 30 kHz. In this case, the frequency band may consist of 51 PRBs. The UL control channel may be arranged every five PRBs. The arrangement structure of the UL control channel may be an interlace structure. In the exemplary embodiment shown in FIG. 3A, one UL control channel may occupy one PRB in the frequency domain and two symbols in the time domain. In the exemplary embodiment shown in FIG. 3B, one UL control channel may occupy one PRB in the frequency domain and four symbols in the time domain.

The UL control channel may include a demodulation-reference signal (DM-RS) resource. The DM-RS resource may be time-division multiplexed (TDMed) or frequency-division-multiplexed (FDMed) with uplink control information (UCI) resources. Five interlaces may be defined in the entire band of the communication system. Each interlace may have 10 PRBs or 11 PRBs. When the bandwidth of the communication system is 20 MHz and the subcarrier spacing thereof is a value (e.g., 15 kHz, 60 kHz, 120 kHz, 240 kHz, etc.) other than 30 kHz, the number of PRBs constituting each interlace may be different from the number of PRBs in the above-described exemplary embodiment.

Meanwhile, the base station may transmit a discovery signal and system information. The discovery signal may be a discovery reference signal (DRS) composed of a SS/PBCH block consisting of a primary synchronization signal (PSS), a secondary synchronization signal (SSS), and a physical broadcast channel (PBCH), or 'SS/PBCH block and a reference signal (e.g., channel state information-reference signal (CSI-RS), etc.)'. When the communication system operates in a licensed band, the base station may periodically transmit the discovery signal. On the other hand, when the communication system operates in an unlicensed band, the base station may transmit the discovery signal aperiodically. The base station may transmit system information through a PDSCH, and may transmit information for decoding the system information through a PDCCH. The terminal may recognize the presence of the base station by receiving the discovery signal, derive a resource position of the PDSCH based on information obtained from the PDCCH (e.g., information elements included in the DCI), and decode the system information included in the PDSCH. The system information may include resource allocation information of a physical random access channel (PRACH). The terminal may establish an RRC connection with the base station by performing an initial access procedure using the PRACH indicated by the resource allocation information included in the system information.

Figure 4A:
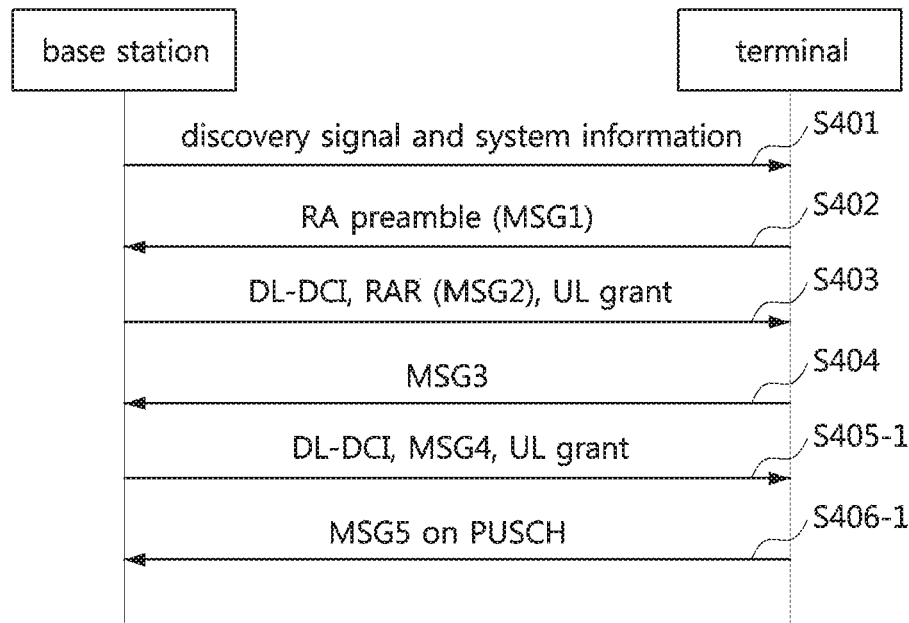
FIG. 4A is a sequence chart illustrating a first exemplary embodiment of an initial access procedure in a communication system.
Figure 4B:
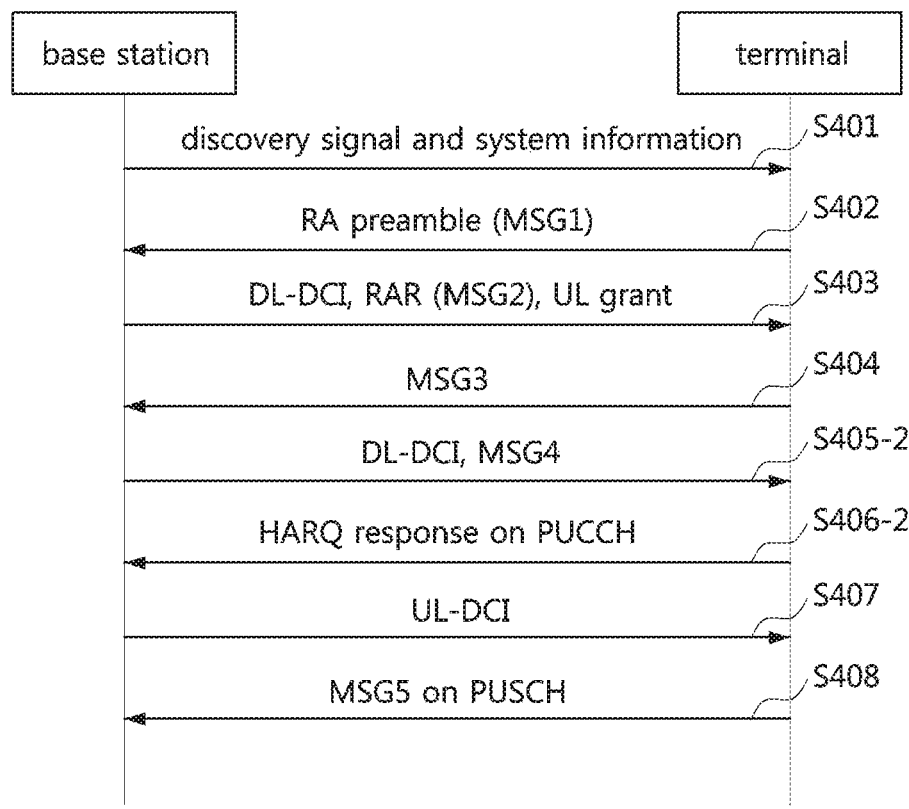
FIG. 4B is a sequence chart illustrating a second exemplary embodiment of an initial access procedure in a communication system.

FIG. 4A is a sequence chart illustrating a first exemplary embodiment of an initial access procedure in a communication system, and FIG. 4B is a sequence chart illustrating a second exemplary embodiment of an initial access procedure in a communication system.

Referring to FIGS. 4A and 4B, the base station may transmit a discovery signal (e.g., SS/PBCH block or DRS block) and system information to the terminal (S401). The terminal may receive the discovery signal and the system information from the base station, and may identify resource allocation information of a PRACH included in the system information. The terminal may transmit a random access (RA) preamble (e.g., MSG1) to the base station through the PRACH indicated by the resource allocation information (S402).

The base station may receive RA preamble(s) from unspecified terminal(s), and may transmit a random access response (RAR) message (e.g., MSG2) for the RA preamble through a PDSCH (S403). The RAR may include an index of the RA preamble detected at the base station. In addition, in the step S403, DCI including scheduling information of the PDSCH through which the RAR is transmitted and/or uplink resource allocation information (e.g., UL grant) may be transmitted from the base station to the terminal. Here, the UL grant may be included in the RAR. In the exemplary embodiments, DCI including a DL grant may be referred to as 'DL-DCI' and DCI including a UL grant may be referred to as 'UL-DCI'.

The terminal may receive the RAR from the base station, and may compare an index of the RA preamble included in the RAR with an index of the RA preamble transmitted by the terminal in the step S402. When the index of the RA preamble included in the RAR is different from the index of the RA preamble transmitted by the terminal in the step S402, the terminal may perform the step S402 again. When the index of the RA preamble included in the RAR is the same as the index of the RA preamble transmitted by the terminal in the step S402, the terminal may transmit a MSG3 through a PUSCH indicated by the UL grant received in the step S403 (S404). The MSG3 may be an RRC connection request message. The terminal may perform an encoding operation on the RRC connection request message, and may map the encoded RRC connection request message to the PUSCH.

The base station may receive the MSG3 (e.g., RRC connection request message) from the terminal. The base station may transmit a MSG4 to the terminal through a PDSCH (S405-1, S405-2). The MSG4 may be an RRC connection setup message, and the RRC connection setup message may include a terminal identifier (e.g., cell-radio network temporary identifier (C-RNTI)). In the step S405-1 shown in FIG. 4A, DCI including scheduling information of the PDSCH through which the MSG4 is transmitted may be transmitted from the base station to the terminal. In the step S405-2 shown in FIG. 4B, the DCI and a UL grant including scheduling information of the PDSCH through which the MSG4 is transmitted may be transmitted from the base station to the terminal. The terminal may receive the MSG4 from the base station, and may determine whether a contention (e.g., collision) has been resolved based on the terminal identifier included in the MSG4.

In a step S406-1 shown in FIG. 4A, when the MSG4 is successfully received in the step S405-1, the terminal may transmit ACK for the MSG4 to the base station through a PUSCH. The HARQ response (e.g., ACK) may be a MSG5. The PUSCH through which the ACK is transmitted may be indicated by the UL grant received in the step S405-1. On the other hand, when the MSG4 is not successfully received in the step S405-1 (e.g., when NACK for the MSG4 occurs), the terminal may not perform subsequent procedures. In this case, the terminal may not transmit NACK for the MSG4 to the base station through the PUSCH. Alternatively, in the step S406-1, the terminal may transmit NACK for the MSG4 to the base station through the PUSCH.

When ACK for the MSG4 is received from the terminal, the base station may determine that the MSG4 has been successfully received at the terminal. When the HARQ response for the MSG4 is not received from the terminal within a preconfigure time duration or when NACK for the MSG4 is received, the base station may determine that MSG4 has not been received at the terminal. That is, the base station may determine that the collision of the MSG4 has occurred. When the MSG4 is not received, the terminal may expect to receive the MSG4 from the base station again.

When a collision is detected in an identification procedure of the terminal identifier (e.g., C-RNTI, temporary C-RNTI (i.e., TC-RNTI)), the terminal may perform the initial access procedure again.

When there is no terminal that has transmitted the MSG5 in step S406-1, the base station may not distinguish between a case when the decoding operation of the MSG4 has failed in the terminal and a case when MSG5s of terminals collide. In this case, the base station may retransmit the MSG4 within a specific time window to establish the RRC connection with the terminal. Alternatively, the base station may not perform the retransmission procedure of the MSG4. When the MSG4 is not retransmitted, the time window may be unnecessary.

Meanwhile, in the step S406-2 shown in FIG. 4B, the terminal may transmit the HARQ response (e.g., ACK or NACK) for the MSG4 to the terminal through a PUCCH. The PUCCH through which the HARQ response for the MSG4 is transmitted may be configured in the terminal in the initial access procedure. The base station may receive the HARQ response from the terminal, and may determine whether the MSG4 has been successfully received at the terminal based on the HARQ response. The base station may transmit DCI (e.g., UL-DCI) including a UL grant to the terminal (S407). The terminal may receive the DCI from the base station, and may transmit the MSG5 to the base station using a PUSCH indicated by the UL grant included in the DCI (S408). The base station may receive the MSG5 from the terminal.

Energy Detection Threshold

An energy detection threshold used for a listen-before-talk (LBT) operation may be indicated by information included in the UL grant belonging to the RAR or information other than the UL grant. The terminal performing the LBT operation may compare an energy detection result with the energy detection threshold in sensing slot(s) belonging to a defer duration. When the energy detection result is less than the energy detection threshold, the terminal may determine that the sensing slot(s) are in an idle state. When the energy detection result is greater than or equal to the energy detection threshold, the terminal may determine that the corresponding sensing slot(s) are in a busy state. Here, the sensing slot may have a length of 9 µs.

The sensing slot may be distinguished from a slot used for transmitting data and/or control information. An energy detection threshold offset may be used instead of the energy detection threshold. The energy detection threshold may be 'maxEnergyDetectionThreshold' defined in the technical specification, and the energy detection threshold offset may be 'energyDetectionThresholdOffset' defined in the technical specification. The terminal may derive the energy detection threshold in dB units based on the contents defined in the section 4.2.3 of the 3GPP technical specification (TS) 37.213.

Remaining Minimum System Information (RMSI) in a Communication System Operating in an Unlicensed Band The terminal may synchronize with the base station by receiving the discovery signal (e.g., SS/PBCH block or DRS block) from the base station, and may obtain configuration information of a CORESET 0 (or Type0-PDCCH common search space) from a PBCH of the discovery signal. The terminal may perform a PDCCH monitoring operation in a search space 0 within the CORESET 0, and obtain a system information block 1 (SIB1) (e.g., RMSI) in a PDSCH-1_0 indicated by DCI obtained by the PDCCH monitoring operation. The terminal may obtain configuration information for an initial access procedure from the SIB1. The RMSI (e.g., SIB1) may include one or more of the following information elements (PRACH configuration information, energy detection threshold, PUCCH configuration information, common radio identifier).

PRACH Configuration Information

The RMSI may include PRACH configuration information. The PRACH configuration information may include time resource information and frequency resource information of a PRACH through which a RA preamble is transmitted. In addition, information indicating a subcarrier spacing used for transmission of the RA preamble may be included in the RMSI.

Energy Detection Threshold

The RMSI may include the energy detection threshold. The terminal may perform an LBT operation to transmit the RA preamble. In this case, the terminal may transmit the RA preamble when all sensing slots belonging to a defer duration are determined to be in the idle state. The terminal may detect an energy of a received signal in each sensing slot (or a portion of each sensing slot) belonging to the defer duration, and when the energy detection result is less than the energy detection threshold, the terminal may determine that the corresponding sensing slot is in the idle state. On the other hand, when the energy detection result is greater than or equal to the energy detection threshold, the terminal may determine that the corresponding sensing slot is in the busy state. The energy detection threshold may be used to determine whether or not it is possible to access the corresponding channel.

As described above, the energy detection threshold offset may be used instead of the energy detection threshold. The energy detection threshold may be 'maxEnergyDetectionThreshold' defined in the technical specification, and the energy detection threshold offset may be 'energyDetectionThresholdOffset' defined in the technical specification. The terminal may derive the energy detection threshold in dB units based on the contents defined in the section 4.2.3 of the 3GPP technical specification (TS) 37.213.

PUCCH Configuration Information

The RMSI may include PUCCH configuration information. The PUCCH configuration information may include time resource information and frequency resource information of the PUCCH through which the HARQ response is transmitted in the initial access procedure. The PUCCH configuration information may be included in the UL grant.

Common Radio Identifier (e.g., RNTI)

The RMSI may include a radio identifier (e.g., common radio identifier). The terminal(s) may transmit a PUSCH according to a trigger scheme. When the terminal transmits a PUSCH according to the trigger scheme within a time duration (e.g., channel occupancy time (COT)) secured by the base station, the LBT operation may be simplified, and orthogonality between PUSCHs transmitted by a plurality of terminals can be ensured at the base station.

The first PUSCH transmitted by the terminal in the initial access procedure may be the MSG3, and the MSG3 may be the HARQ response to the RAR. The common RNTI may be included in the RAR instead of the RMSI. The information obtained through the RMSI may be used in the initial access procedure or the RRC connection reconfiguration procedure. Until an HARQ response (e.g., ACK) for an RRC message is received from the terminal in the RRC connection reconfiguration procedure, the base station may not know how the corresponding RRC message is reflected in the terminal. In this reason, it may be preferable to use information that the terminal can obtain in the RRC idle state. Therefore, it may be preferable for the common RNTI to be included in the RMSI. On the other hand, when information other than the common RNTI is exchanged through the RRC messages in the RRC connection reconfiguration procedure, the common RNTI may not be included in the RMSI.

RAR in a Communication System Operating in an Unlicensed Band

When the base station operates in a licensed band, the RAR may be configured in units of bytes. For example, the size of the RAR may be n bytes. Here, n may be a natural number.

FIG. 5 is a conceptual diagram illustrating a first exemplary embodiment of an RAR in a communication system, and FIG. 6 is a conceptual diagram illustrating a first exemplary embodiment of an UL grant included in an RAR in a communication system.

Referring to FIG. 5, an RAR (e.g., MAC RAR) may include a timing advance (TA) command, a UL grant, and information on a temporary identifier (e.g., a temporary C-RNTI (TC-RNTI)). The MAC layer of the terminal may generate the RAR, the RAR may be encoded, and the encoded RAR may be mapped to a PUSCH.

Referring to FIG. 6, the UL grant included in the RAR may include a frequency hopping flag, PUSCH frequency resource allocation information, PUSCH time resource allocation information, modulation and coding scheme (MCS) information, transmission power control (TPC) command for a PUSCH, and CSI request information. On the other hand, in the communication system operating in an unlicensed band, the UL grant included in the RAR may include one or more information elements and additional information element(s) shown in FIG. 6. New field(s) may be introduced to the UL grant for the additional information element(s). Existing fields included in the UL grant may be unnecessary.

UL Grant Included in RAR

The UL grant may include one or more of the following information elements. Since the UL grant is included in a MAC message, all the fields constituting the UL grant may be configured in units of bytes. To support this operation, specific bit(s) in the fields may be configured as reserved bits. Alternatively, the specific bit(s) may be set to a predefined value (e.g., '0' or '1'). The terminal may generate a codeword by performing an encoding operation on the UL grant, and may map the codeword to a PUSCH.

Trigger Field

The UL grant belonging to the RAR may include a trigger field. The number of trigger fields included in the UL grant may vary depending on the triggering scheme of a PUSCH. One trigger field (e.g., trigger A field) or two trigger fields (e.g., trigger A field and trigger B field) may be needed for triggering PUSCH transmission. The trigger A field and the trigger B field may be included in different UL grants (or different PDCCHs).

The trigger A field included in the UL grant may indicate two different values. The terminal may determine whether to perform a monitoring operation on the trigger B field according to the value indicated by the trigger A field. The trigger A field set to a first value (e.g., '0') may indicate a non-trigger scheme. In this case, the terminal may transmit the PUSCH based on the UL grant. For example, the terminal may identify a slot in which the LBT operation for PUSCH transmission starts based on a slot offset field included in the UL grant. The trigger A field set to a second value (e.g., '1') may indicate a triggering scheme. In this case, the terminal may receive an additional PDCCH that triggers PUSCH transmission. The additional PDCCH may include the trigger B field. The terminal may identify the slot in which the LBT operation for PUSCH transmission starts based on the information element(s) (e.g., trigger B field) included in the additional PDCCH.

Common RNTI

The RAR (e.g., UL grant belonging to the RAR) may include a radio identifier (e.g., common RNTI). The terminal(s) may transmit a PUSCH according to the trigger scheme. When the terminal transmits a PUSCH according to the trigger scheme within a time duration (e.g., COT) secured by the base station, the LBT operation may be simplified, and orthogonality between PUSCHs transmitted by a plurality of terminals may be ensured at the base station.

The terminal may generate a PUSCH using the UL grant belonging to the RAR to transmit the MSG3. A method of indicating a transmission time point of the PUSCH may vary according to the value of the trigger field included in the UL grant. For example, the UL grant (e.g., the UL grant belonging to the RAR) may include information indicating the transmission time point of the PUSCH. Alternatively, an additional UL grant scrambled by a common RNTI may include information indicating the transmission time point of the PUSCH.

The UL grant (e.g., common DCI) addressed by the common RNTI may be transmitted to unspecified terminal(s) and may not include PUSCH resource allocation information. The common DCI may play a role (e.g., a trigger role) of indicating a slot in which the PUSCH can be transmitted.

Slot Offset Field

The UL grant belonging to the RAR may include a slot offset field. The terminal may identify a slot in which the LBT operation for PUSCH transmission starts based on a time offset indicated by the slot offset field. The time offset(s) may be defined in the technical specification. The base station may transmit to the terminal the UL grant including the slot offset field indicating an index of one time offset among the time offset(s) defined in the technical specification.

When the RAR does not include the trigger field, when the trigger field is not configured to the terminal through higher layer signaling, or when the trigger A field is set to the first value, the terminal may determine the slot in which the LBT operation for PUSCH transmission starts by applying the time offset from the slot in which the RAR is received. When the trigger A field is set to the second value, the terminal may determine the slot in which the LBT operation for PUSCH transmission starts by applying the time offset from the slot in which the trigger B field is received. The trigger B field may be included in the common DCI.

Start Symbol and Length Field

The UL grant belonging to the RAR may include a start symbol and length field. The start symbol and length field may express the start symbol of the PUSCH or the start symbol and the end symbol of the PUSCH as one index. The terminal may identify the start symbol of the PUSCH and the number of symbols belonging to the PUSCH based on the index indicated by the start symbol and length field. The PUSCH may be configured based on a type A mapping scheme or a type B mapping scheme.

Start Time Point Field

The UL grant belonging to the RAR may include a start time point field, and the start time point field may indicate a start time point of the PUSCH. The transmission of the PUSCH may start at a slot boundary. Alternatively, considering a time and/or a TA required for the LBT operation, the transmission of the PUSCH may be started at a time point not a symbol boundary. The transmission of the PUSCH may start at a symbol j, a symbol j+1, or a time point between the symbol j and the symbol j+1. Alternatively, the transmission of the PUSCH may start at a time point after a preconfigured time (e.g., 25 μs or 16 μs) from the start of the symbol j or at a time point after a (preconfigured time (e.g., 25 μs or 16 μs)+TA) from the start of the symbol j. In this case, the transmission of the PUSCH may be performed by extending a cyclic prefix (CP) of the symbol j+1. According to this operation, a phase of a waveform of the symbol may be continuously expressed, and a peak to average power ratio (PAPR) of the symbol j+1 may be reduced. The slot and the start symbol in which the PUSCH is transmitted may be indicated by the RAR (e.g., UL grant belonging to the RAR). In addition, the transmission time point of the PUSCH within the start symbol may be indicated by the RAR (e.g., UL grant belonging to the RAR).

Frequency Resource Field

The UL grant belonging to the RAR may include a frequency resource field, and the frequency resource field may indicate a frequency resource of the PUSCH. The frequency resource of the PUSCH may be indicated by one or more interlace indexes. The terminal may identify PRB(s) in which the PUSCH is transmitted based on the interlace index indicated by the frequency resource field. Only a small number of bits may be needed to express all interlaces. Therefore, the frequency resource field included in the UL grant may consist of only a small number of bits.

The transmission operation of the PUSCH (e.g., PUSCH including the MSG3) that is a response to the RAR may be performed in one LBT subband. The LBT subband may mean a resource block (RB) set. The base station may transmit information indicating that the transmission operation of the PUSCH is performed in a licensed carrier (e.g., supplementary uplink (SUL) carrier) or an unlicensed carrier to the terminal. Here, the licensed carrier may mean a carrier located in a licensed band, and the unlicensed carrier may mean a carrier located in an unlicensed band. The carrier in which the RA preamble is transmitted may be the same as the carrier in which the PUSCH including the MSG3 is transmitted. Alternatively, the carrier in which the RA preamble is transmitted may be different from the carrier in which the PUSCH including the MSG3 is transmitted.

When the terminal transmits the RA preamble and the MSG3 (e.g., PUSCH including the MSG3) in a licensed carrier, the conventional initial access procedure may be performed. When the RA preamble is transmitted in an unlicensed carrier and the MSG3 (e.g., PUSCH including the MSG3) is transmitted in a licensed carrier, the UL grant belonging to the RAR may include a field indicating the licensed carrier (e.g., licensed band) in which the MSG3 is transmitted. For example, the UL grant may include a carrier field indicating a carrier index. The carrier indicated by the carrier field included in the UL grant may be the carrier (e.g., licensed carrier or unlicensed carrier) used for the transmission of the MSG3.

In a proposed method, the RAR may be mapped to one interlace. Therefore, the UL grant belonging to the RAR may include one interlace index. The UL grant scheduling the PUSCH may include one or more interlace indexes. In this case, the UL grant may include a bitmap or a code point indicating a combination of one or more interlace indexes. Each bit included in the bitmap may correspond to one interlace index. When the code point is used, the size of the frequency resource field included in the UL grant may be reduced.

In another proposed method, the RAR may be mapped to up to a predetermined number of interlace(s). The UL grant belonging to the RAR may include a bitmap or a code point indicating one or more interlace indexes. The maximum number of interlaces to which the MSG3 (e.g., PUSCH including the MSG3) is mapped may be limited. The maximum number of interlaces for the MSG3 may be defined in the technical specification. Alternatively, the base station may transmit information indicating the maximum number of interlaces for the MSG3 to the terminal using higher layer signaling.

Channel Access Information Field

The UL grant belonging to the RAR may include a channel access information field. The channel access field may indicate the type of LBT operation performed for transmission of the PUSCH. For example, the channel access information field set to a first value may indicate a first type of LBT operation. The channel access information field set to a second value may indicate a second type of LBT operation.

When the first type of LBT operation is used, the terminal may randomly select a backoff value within a contention window, and perform a backoff operation based on the selected backoff value. The backoff value may be determined by the contention window, a random variable, and/or an additional parameter(s). The additional parameter(s) may include a priority of the PUSCH. The size of the contention window may be determined according to the priority of the PUSCH. In addition, the additional parameter(s) may further include configuration information of a maximum COT (MCOT) and/or the length Td of the defer duration.

When the PUSCH is transmitted based on the UL grant belonging to the RAR, the priority of the PUSCH may have one value. The priority of the PUSCH may be defined in the technical specification. In this case, the base station may not signal information indicating the priority of the PUSCH to the terminal. The terminal may perform a channel sensing operation (e.g., energy detection operation) in a time duration (e.g., defer duration) corresponding to the selected backoff value, and transmit the MSG3 (e.g., PUSCH including the MSG3) when an energy detection result is less than the energy detection threshold in all sensing slots belonging to the defer duration.

When the second type of LBT operation is used, the terminal may perform a channel sensing operation (e.g., energy detection operation) in all sensing slots belonging to the defer duration without a random backoff operation. When an energy detection result is less than the energy detection threshold in all the sensing slots belonging to the defer duration, the terminal may transmit the MSG3 (e.g., PUSCH including the MSG3). Herein, the length of the defer duration may be several tens of microseconds (e.g., 25 μs or 16 μs).

According to another method, the channel access information field may indicate three or more values. For example, the channel access information field may indicate at least a first value, a second value, a third value, or a fourth value. The channel access information field set to the first value may indicate the first type of LBT operation. The channel access information field set to the second value may indicate the second type of LBT operation. The channel access information field set to the third value may indicate the third type of LBT operation. The channel access information field set to the fourth value may indicate the fourth type of LBT operation.

When the first type of LBT operation is used, the terminal may transmit a signal after performing a random backoff operation. The channel access method according to the second type of LBT operation may be the same as the channel access method according to the third type of LBT operation, and parameter(s) used for the channel access according to the second type of LBT operation may be different from parameter(s) used for the channel access according to the third type of LBT operation. When the second type or the third type of the LBT operation is used, the terminal may perform a channel sensing operation in a preconfigured defer duration without a random backoff operation. However, the length (e.g., 25 μs) of the defer duration according to the second type of LBT operation may be different from the length (e.g., 16 μs) of the defer duration according to the third type of LBT operation. When the fourth type of LBT operation is used, the terminal may transmit a signal without performing the channel sensing operation.

Sequence Field

The UL grant belonging to the RAR may include a sequence field. The sequence field included in the UL grant may include a scrambling sequence of the PUSCH and/or an initialization sequence of a PUSCH DM-RS. The PUSCH DM-RS may be a DM-RS used for demodulation of the PUSCH. When the above-described sequence is generated based on cell identification information (e.g., physical cell identifier (PCI)) and/or time information (e.g., slot index or symbol index), the base station may not signal information indicating the sequence (e.g., information indicated by the sequence field) to the terminal.

HARQ Response Method for an MSG4 in an Unlicensed Band

In the exemplary embodiments shown in FIGS. 4A and 4B, the base station may transmit DL-DCI including scheduling information of the MSG4 to the terminal, and transmit the MSG4 through a PDSCH indicated by the scheduling information included in the DL-DCI. The terminal may receive the DL-DCI from the base station, and may receive the MSG4 from the base station through the PDSCH indicated by the scheduling information included in the DL-DCI. The terminal may generate an HARQ response for the MSG4, and may transmit the HARQ response to the base station through a PUCCH or a PUSCH.

In order to transmit the PUCCH including the MSG4, the base station may inform the terminal of time resource information of the PUCCH, frequency resource information of the PUCCH, and sequence information. The time resource information of the PUCCH, frequency resource information of the PUCCH, and sequence information may be included in the DL-DCI (e.g., DL-DCI including the scheduling information of the MSG4). Some of the configuration information (hereinafter, referred to as 'partial configuration information') of the PUCCH may be indicated by the DL-DCI, and the remaining configuration information of the PUCCH may be indicated to the terminal before the transmission of the PUCCH. Various methods may be applied according to a DL transmission.

MSG4 Including Resource Allocation Information of PUCCH

In a proposed method, the base station may transmit the MSG4 including resource allocation information of the PUCCH to the terminal. The terminal may receive the MSG4 from the base station, and may identify the resource allocation information of the PUCCH included in the MSG4. The terminal may determine that a collision has not occurred when the MSG4 is successfully received. Therefore, the resource allocation information of the PUCCH may be indicated by the MSG4 or a DL transmission before the MSG4.

On the other hand, when the MSG4 is not received from the base station, it may be preferable for the terminal to transmit NACK for the MSG4 to the base station. Since a reason of the NACK for the MSG4 is a channel fading, it may be preferable that the base station retransmits the MSG4 to the terminal. When the base station does not retransmit the MSG4 to the terminal, the terminal may need to perform the initial access procedure again because the terminal does not know whether the failure of the MSG4 reception is due to a collision or a channel fading.

In an unlicensed band, the MSG4 may include resource allocation information (e.g., slot offset) of a PUCCH and/or information indicating the type of LBT operation (e.g., LBT category 2 or LBT category 4). In addition, the MSG4 may include information indicating a transmission scheme (e.g., trigger scheme or non-trigger scheme) of the PUCCH.

When the MSG4 includes the resource allocation information of the PUCCH and the reception of the MSG4 fails, the terminal may not transmit NACK for the MSG4 to the base station through the PUCCH because the terminal does not know the resource allocation information of the PUCCH. In order to solve this problem, the base station may inform the terminal of the resource allocation information of the PUCCH through the DL-DCI scheduling the MSG4 or a DL transmission before the DL-DCI.

MSG2 and/or Other DL Channel Including Resource Allocation Information of PUCCH

The base station may transmit a RAR (e.g., MSG2) including partial configuration information of the configuration information (e.g., resource allocation information) of the PUCCH, and may transmit a DL channel (e.g., the DL-DCI scheduling the MSG4, the MSG4, or a combination of the DL-DCI and the MSG4) including the remaining configuration information of the PUCCH. The terminal may identify the configuration information (e.g., resource allocation information) of the PUCCH based on the RAR and DL channel received from the base station. When the remaining configuration information of the PUCCH is included in the DL-DCI, the resource allocation information (i.e., the remaining configuration information) of the PUCCH may be explicitly included in the DL-DCI. Alternatively, the resource allocation information of the PUCCH may be indicated based on a function of an index of a control channel element (CCE) to which the DL-DCI is mapped. Alternatively, the resource allocation information of the PUCCH may be indicated based on a combination of a field included in the DL-DCI and the index of the CCE to which the DL-DCI is mapped.

Since the MSG2 is transmitted before the transmission of the MSG4, the MSG2 may include the resource allocation information of the PUCCH (e.g., the PUCCH on which the HARQ response for the MSG4 is transmitted). For example, the MSG2 may include the resource allocation information of the PUCCH on which the HARQ response for the MSG4 is transmitted as well as the UL grant for the MSG3.

Since the RAR is transmitted to unspecified terminal(s), the resource allocation information of the PUCCH included in the RAR may be used by a plurality of terminals. That is, the RAR may include common resource allocation information, and the common resource allocation information may indicate the PUCCH on which the HARQ response for the MSG4 is transmitted. Accordingly, the terminals may transmit HARQ responses for the MSG4 through the same PUCCH. When the collision (e.g., contention) between the terminals is not resolved, the base station may receive ACK for the MSG4 from the first terminal and NACK for the MSG4 from the second terminal through the PUCCH. In this case, the base station may determine that there is a collision between the terminals. That is, the base station may determine that the contention has not been resolved. When only the ACK for the MSG4 is received through the PUCCH, the base station may determine that the collision between the terminals has been resolved.

The partial configuration information of the PUCCH included in the RAR may not include time resource information of the PUCCH through which the HARQ response for the MSG4 is transmitted. For example, the RAR may include sequence information of the PUCCH, frequency allocation information (e.g., interlace index) of the PUCCH, sequence information of the PUCCH DM-RS, and the like. The remaining configuration information of the PUCCH not included in the RAR may include time resource information (e.g., slot offset) of the PUCCH and/or information indicating the LBT type (e.g., LBT category 2 or LBT category 4). In addition, the configuration information of the PUCCH may include information indicating a transmission scheme (e.g., trigger scheme or non-trigger scheme) of the PUCCH.

RAR and DL-DCI

The RAR may include resource set information of the PUCCH. The base station may transmit the RAR including the resource set information of the PUCCH used in the initial access procedure to unspecified terminal(s). The resource set information of the PUCCH included in the RAR may include information indicating the first symbol of the PUCCH, the number of symbols constituting the PUCCH in the time domain, and/or the interlace index(es) of the PUCCH. The remaining configuration information of the PUCCH not included in the RAR may be transmitted through a DL channel.

The terminal may receive a SS/PBCH block from the base station, and may obtain cell identification information from the SS/PBCH block. The terminal may initialize the sequence of the PUCCH DM-RS using the cell identification information. The terminal may perform a scrambling operation on data and/or control information transmitted through an uplink channel (e.g., PUCCH) using the cell identification information.

The DL-DCI scheduling the MSG4 may include a PUCCH resource indicator, a slot offset for transmitting an HARQ response, and/or information indicating a transmission scheme of the PUCCH (e.g., trigger A field). When the remaining configuration information of the PUCCH is included in the DL-DCI, the resource allocation information (i.e., the remaining configuration information) of the PUCCH may be explicitly included in the DL-DCI scheduling the MSG4. Alternatively, the resource allocation information of the PUCCH may be indicated based on a function of an index of a CCE to which the DL-DCI is mapped. Alternatively, the resource allocation information of the PUCCH may be indicated based on a combination of the field included in the DL-DCI and the index of the CCE to which the DL-DCI is mapped. In addition, the DL-DCI scheduling the MSG4 may further include an offset of the first symbol in which the PUCCH is transmitted. The offset may indicate that the transmission time point of the PUCCH is the start time point of the symbol (e.g., symbol boundary), after 16 μs or 25 μs from the start time point of the symbol, or after ((16 μs or 25 μs)+TA) from the start time point of the symbol.

The configuration information of the PUCCH may be included in the RMSI as well as the RAR. The reason is that when the size of the HARQ response for the MSG4 is 1 bit, the number of bits required for indicating the resource of the PUCCH is small. When the initial access procedure is performed in a licensed band, the configuration information of the PUCCH through which the HARQ response for the MSG4 is transmitted may be included in the RMSI. In the RRC connection reconfiguration procedure, the configuration information of the PUCCH may not be indicated by the RAR. In this case, the base station may inform the terminal of the configuration information of the PUCCH through separate signaling.

RMSI and DL Channel Including Resource Allocation Information of PUCCH

The base station may transmit the RMSI including the partial configuration information of the configuration information (e.g., resource allocation information) of the PUCCH, and the DL channel including the remaining configuration information of the PUCCH (e.g., DL-DCI scheduling the MSG4, the MSG4, the RAR, or a combination of two or more among the DL-DCI, the MSG4, and the RAR). The terminal may identify the configuration information (e.g., resource allocation information) of the PUCCH based on the RAR and the DL channel received from the base station. When the remaining configuration information of the PUCCH is included in the DL-DCI, the resource allocation information (i.e., the remaining configuration information) of the PUCCH may be explicitly included in the DL-DCI. Alternatively, the resource allocation information of the PUCCH may be indicated based on a function of an index of the CCE to which the DL-DCI is mapped. Alternatively, the resource allocation information of the PUCCH may be indicated based on a combination of the field included in the DL-DCI and the index of the CCE to which the DL-DCI is mapped.

In the NR communication system operating in a licensed band, the base station may transmit an RMSI including resource sets of the PUCCH to an unspecified terminal(s), and may transmit to the terminal DL-DCI (e.g., DL-DCI scheduling the MSG4) indicating one element among the resource sets of the PUCCH included in the RMSI. The terminal may receive the RMSI from the base station, and may identify the resource sets of the PUCCH included in the RMSI. In addition, the terminal may receive the DL-DCI scheduling the MSG4 from the base station, select one resource from the resource sets of the PUCCH based on the information included in the DL-DCI, and use the selected resource to transmit the HARQ response for the MSG4 to the base station.

Since the RMSI is transmitted to unspecified terminal(s), the resource allocation information of the PUCCH included in the RMSI may be used by a plurality of terminals. That is, the RMSI may include common resource allocation information, and the common resource allocation information may indicate a PUCCH through which the HARQ response for the MSG4 is transmitted. Accordingly, the terminals may transmit HARQ responses for the MSG4 through the same PUCCH. When the collision (e.g., contention) between the terminals is not resolved, the base station may receive ACK for the MSG4 from the first terminal and NACK for the MSG4 from the second terminal through the PUCCH. In this case, the base station may determine that there is a collision between the terminals. That is, the base station may determine that the contention has not been resolved. When only the ACK for the MSG4 is received through the PUCCH, the base station may determine that the collision between the terminals has been resolved.

The partial configuration information of the PUCCH included in the RMSI may not include time resource information of the PUCCH through which the HARQ response for the MSG4 is transmitted. For example, the RMSI may include sequence information of the PUCCH, frequency allocation information (e.g., interlace index) of the PUCCH, sequence information of the PUCCH DM-RS, and the like. The remaining configuration information of the PUCCH not included in the RMSI may include time resource information (e.g., slot offset) of the PUCCH and/or information indicating the LBT type (e.g., LBT category 2 or LBT category 4). In addition, the configuration information of the PUCCH may include information indicating a transmission scheme (e.g., trigger scheme or non-trigger scheme) of the PUCCH.

RMSI and DL-DCI

The RMSI may include resource set information of the PUCCH. The base station may transmit the RMSI including the resource set information of the PUCCH used in the initial access procedure to unspecified terminal(s). The resource set information of the PUCCH included in the RMSI may include information indicating the first symbol of the PUCCH, the number of symbols constituting the PUCCH in the time domain, and/or the interlace index(es) of the PUCCH. The remaining configuration information of the PUCCH not included in the RMSI may be transmitted through a DL channel.

The terminal may receive a SS/PBCH block from the base station, and may obtain cell identification information from the SS/PBCH block. The terminal may initialize the sequence of the PUCCH DM-RS using the cell identification information. The terminal may perform a scrambling operation on data and/or control information transmitted through an uplink channel (e.g., PUCCH) using the cell identification information.

The DL-DCI scheduling the MSG4 may include a PUCCH resource indicator, a slot offset for transmitting an HARQ response, and/or information indicating a transmission scheme of the PUCCH (e.g., trigger A field). Also, the DL-DCI scheduling the MSG4 may further include an offset of the first symbol in which the PUCCH is transmitted. The offset may indicate that the transmission time point of the PUCCH is the start time point of the symbol (e.g., symbol boundary), after 16 μs or 25 μs from the start time point of the symbol, or after ((16 μs or 25 μs)+TA) from the start time point of the symbol.

When the remaining configuration information of the PUCCH is included in the DL-DCI, the resource allocation information (i.e., the remaining configuration information) of the PUCCH may be explicitly included in the DL-DCI scheduling the MSG4. Alternatively, the resource allocation information of the PUCCH may be indicated based on a function of an index of the CCE to which the DL-DCI is mapped. Alternatively, the resource allocation information of the PUCCH may be indicated based on a combination of the field included in the DL-DCI and the index of the CCE to which the DL-DCI is mapped.

The resource allocation information of the PUCCH included in the RMSI may be used in the RRC connection reconfiguration procedure as well as the initial access procedure. The base station may transmit an RRC message to the terminal through a PDSCH, the terminal may transmit to the base station an RRC message including an HARQ response (e.g., ACK) for the RRC message received from the base station through a PUSCH.

The resource of the PUCCH in the RRC connection reconfiguration procedure may be a fallback resource or a default resource. The base station may transmit the RMSI including information on the fallback resource of the PUCCH to the terminal. The terminal may receive the RMSI from the base station, and may identify the information on the fallback resource of the PUCCH included in the RMSI. Since the base station does not use two or more codewords in the initial access procedure or the RRC connection reconfiguration procedure, the size of the HARQ response may be 1 bit.

MSG4 Including UL Gran in a Communication System Operating in an Unlicensed Band In the initial access procedure, the base station may transmit the MSG4 through the PDSCH and may receive the HARQ response for the MSG4 from the terminal. When ACK for the MSG4 is received, the base station may determine that the collision between the terminals has been resolved, and may determine that the RRC connection with the corresponding terminal is established. Thereafter, the base station may perform a procedure for exchanging an RRC message with the terminal. This operation may be the exemplary embodiments shown in FIGS. 4A and 4B.

The terminal transmitting the ACK for the MSG4 may establish an RRC connection with the base station. Thereafter, the terminal may exchange other RRC messages (e.g., MSG5, UE capability signaling message, etc.) with the base station. Prior to the transmission/reception procedure of the MSG5, the base station may transmit control information to the terminal using PHY signaling and/or MAC signaling.

The MSG5 may be an RRC message transmitted from the terminal after transmission of the MSG4. The MSG5 may be transmitted on the PUSCH. The terminal may receive the UL grant from the base station, and may transmit the MSG5 to the base station through the PUSCH indicated by the UL grant. The MSG5 may be an RRC message transmitted and received when the RRC connection between the base station and the terminal is established. Accordingly, the base station may consider that the MSG5 is received from the terminal which transmitted the ACK for the MSG4.

In a proposed method, the PDSCH through which MSG4 is transmitted may include the UL grant for the MSG5. The UL grant for the MSG5 may include at least one of information indicating a trigger scheme of the PUSCH (e.g., trigger field), a slot offset field for the PUSCH, a start symbol and length field for the PUSCH, a start time point field for the PUSCH, a frequency resource field for the PUSCH, a channel access field for the PUSCH, and a sequence field for the PUSCH DM-RS.

The PUSCH including the MSG5 may be transmitted based on the trigger scheme. Therefore, the base station may transmit two UL grants for the MSG5. The PDSCH through which the MSG4 is transmitted may include information for reception of the two UL grants (e.g., a first UL grant, a second UL grant (e.g., common DCI)). The UL grant for the MSG5 may include resource allocation information of the PUSCH, information for receiving the common DCI (e.g., common identifier information (e.g., RNTI)), and the like.

The UL grant for scheduling the MSG5 transmission may have various forms and may be transmitted through the PDSCH through which MSG4 is transmitted. For example, the UL grant for the MSG5 may be included in the MSG4. An encoding operation for the MSG4 including the UL grant may be performed, and the encoded MSG4 may be mapped to the PDSCH. Alternatively, the UL grant for the MSG5 may be defined as an RRC message. In this case, the RRC message composed of the UL grant for the MSG5 may be multiplexed with the RRC message composed of the MSG4. An encoding operation may be performed on the multiplexed RRC messages, and the encoded RRC messages may be mapped to a PDSCH. Alternatively, the UL grant for the MSG5 may be defined as a MAC message (e.g., MAC CE). In this case, the MAC message composed of the UL grant for the MSG5 may be multiplexed with the RRC message composed of the MSG4. An encoding operation may be performed on the multiplexed messages, and the encoded messages may be mapped to a PDSCH.

The terminal may receive the UL grant for the MSG5 from the base station. The terminal may transmit the MSG5, which is an HARQ response to the MSG4, to the base station based on the UL grant. In this case, the end time point of the initial access procedure may be earlier than the end time point of the existing initial access procedure. After the initial access procedure ends, the exchange procedure of the RRC messages between the terminal and the base station may be performed.

When the above-described initial access procedure is performed in the communication system operating in an unlicensed band, interference on other terminals and/or a channel occupancy time may be minimized. Thus, the throughput of the communication system can be increased. When the proposed methods are used, in consideration of signaling overhead of the resource allocation information of the PUCCH, a time required for the PUCCH transmission, a time required for the UL grant transmission, etc., there is an advantage that the HARQ response for the MSG4 is not fed back to the base station.

A case when a NACK occurs for the MSG4 in the initial access procedure may be a case when the MSG4 retransmission procedure fails or a case when the collision between terminals has not been resolved. In this case, the initial access procedure may be restarted. That is, the terminal may transmit a RA preamble again. When the NACK for the MSG4 is received from the terminal in the existing initial access procedure, the base station may not identify a reason of the NACK for the MSG4 (e.g., channel fading or collision between terminals).

In a proposed method, when the PUSCH including the MSG5 is received from the terminal, the base station may not distinguish between the channel fading and the collision between terminals. In this case, the base station may reassign the MSG4 to the terminal(s). Since the collision (e.g., contention) between terminals should be resolved within a preconfigured time (e.g., timer for contention resolution, mac-ContentionResolutionTimer), the base station may retransmit the MSG4 before the end of the preconfigured time.

Method of Triggering MSG5

In the following exemplary embodiments, the slot in which the MSG4 is received may be referred to as a slot n. When the trigger field belonging to the UL grant indicates a first value (e.g., '0'), the terminal may transmit a PUSCH to the base station in a slot n+l+k based on one UL grant (e.g., first UL grant). Here, l may be indicated from the base station to the terminal through higher layer signaling. For example, l may be 3 or 4. When l is not indicated by higher layer signaling, l may be one (e.g., 4) of a plurality of values (e.g., natural numbers).

Here, k may mean an offset included in the UL grant. The base station may inform k to the terminal. Alternatively, k may be one of values defined in the technical specification. For example, referring to Table 8-2d of 3GPP TS 36.213, k may have a value from 0 to 15. The UL grant may include an index indicating k, and the size of the index indicating k may be 4 bits. The terminal may determine a slot for transmitting the PUSCH by performing the LBT operation. For example, the terminal may transmit the PUSCH in a slot n+l+k+i. Here, 'i=0, 1, . . . , N−1' may be defined, and N may indicate the number of PUSCHs. N may be a natural number.

N may be fixed to one value according to the type of the UL grant (e.g., the format of the UL grant, the format of the UL-DCI, RNTI).

On the other hand, when the trigger field belonging to the UL grant (e.g., first UL grant) indicates a second value (e.g., '1'), the terminal may receive an additional UL grant (e.g., second UL grant or common DCI), and may transmit a PUSCH based on the additional UL grant. Here, it may be assumed that the terminal receives the common DCI in a slot m. The slot n may be identical to the slot m. Alternatively, the slot n may be different from the slot m. When the slot n is different from the slot m, the slot m may be located after the slot n. When a time interval between the slot n and the slot m is greater than or equal to a time interval defined in the technical specification, the UL grant (e.g., UL grant received in the slot n and/or the slot m) may be considered invalid.

For example, in Table 8-2f of TS 36.213, four maximum time intervals of a slot or subframe are defined. The index included in the UL grant may indicate one of the four maximum time intervals defined in the technical specification. The terminal may identify the maximum time interval based on the index included in the UL grant received from the base station, and may determine that the corresponding UL grant is invalid when the time interval between the slot n and the slot m is greater than or equal to the maximum time interval.

In addition, the common DCI may include a trigger field. The identifier (e.g., RNTI) used for scrambling of the common DCI (e.g., cyclic redundancy check (CRC) of the common DCI) may be different from the identifier used for scrambling of the UL grant. When the trigger field of the common DCI indicates a first value (e.g., '1'), the terminal may transmit a PUSCH in a slot m+l+k. Here, k may be an offset included in the UL grant. The base station may inform k to the terminal using higher layer signaling. Alternatively, k may be defined in the technical specification. For example, k defined in Table 8-2e of 3GPP TS 36.213 may be set to a value from 0 to 3. The UL grant may include an index indicating k, and the size of the index indicating k may be 2 bits.

The UL offset l and a UL duration d may be derived from a specific index included in the common DCI. The base station may inform the terminal of one of specific indexes defined in the technical specification. For example, 32 specific indexes are defined in Table 13A-2 of 3GPP TS 36.213. The base station may transmit DCI including information indicating one specific index among the 32 specific indexes to the terminal.

The terminal may determine a slot for transmitting the PUSCH by performing the LBT operation. For example, the terminal may transmit the PUSCH in a slot n+l+k+i. Here, 'i=0, 1, . . . , N−1' may be defined, and N may indicate the number of PUSCHs. N may be a natural number. N may be fixed to one value according to the type of the UL grant (e.g., the format of the UL grant, the format of the UL-DCI, RNTI). The terminal may not receive the PDCCH in slot(s) in which the PUSCH can be transmitted, and the corresponding slot(s) may be a slot m+l+i. i may be defined as 'i=0, 1, . . . , d−1'.

MSG5 to which a Common DCI is Applied

The UL grant belonging to the MSG4 may include information indicating the type of LBT operation performed for transmission of the MSG5. Accordingly, the terminal may identify the type of LBT operation performed for transmission of the MSG5 based on the information included in the UL grant belonging to the MSG4. The type of LBT operation indicated by the UL grant belonging to the MSG4 may be the LBT category 2 (hereinafter referred to as 'C2 LBT') or LBT category 4 (hereinafter referred to as 'C4 LBT').

When the UL grant belonging to the MSG4 indicates the C4 LBT, the terminal may identify whether a PUSCH can be transmitted in a radio resource indicated by the UL grant by performing the C4 LBT operation. In a time duration (e.g., COT) secured by the base station performing the LBT operation, even when the UL grant belonging to the MSG4 indicates the C4 LBT, the terminal may perform the C2 LBT operation for uplink transmission. Accordingly, the terminal may determine whether a time resource (e.g., slot or subframe) for transmitting the PUSCH belongs to the time duration (e.g., COT) secured by the base station.

In order to support this operation, the base station may transmit DCI including configuration information of the COT secured by the LBT operation to terminal(s). The configuration information of the COT may include information on a pattern of slot(s) or subframe(s) belonging to the COT. The pattern information may include one or more of the number of DL slots, the number of UL slots, the number of slots composed of DL symbols, UL symbols, and FL symbols, an order of slots, and an order of symbols. The pattern information may be represented as a bitmap or an index. The DCI (e.g., common DCI) including the configuration information of the COT may be transmitted to unspecified terminal(s). Therefore, the DCI including the configuration information of the COT (e.g., CRC of the DCI) may be scrambled based on the common RNTI.

The common DCI may include time window information (e.g., the number of slots or the number of subframes constituting a time window). The time window information included in the common DCI may indicate time resource(s) to which the C2 LBT operation is applicable. The terminal(s) may perform the C2 LBT operation for transmission of the PUSCH in the time resource(s) indicated by the time window information included in the common DCI.

Method of Applying an Orthogonal Cover Code (OCC) to a Sequence-Based PUCCH

The UCI may be composed of one or two bits. In this case, a PUCCH including the UCI may be defined based on a scheme of applying a spreading sequence. By appending preconfigured bit(s) to the existing UCI, it is possible to generate a UCI consisting of three bits. For example, a UCI composed of 3 bits may be generated by adding (3-a) 0's to a UCI composed of a bits in a channel encoding procedure. For example, when the Reed Muller code is applied, a codeword may be expressed as a linear combination of a result (e.g., a column vector or a row vector of a matrix) of a product between a matrix defined in the technical specification and the UCI. In particular, when the UCI consists of one bit, it may be interpreted that the UCI is spread to a vector defined by the Reed Muller code.

When the PUCCH is transmitted in an unlicensed band, in order to satisfy the frequency regulation, PRBs belonging to the resource of the PUCCH may be arranged to have a predetermined interval in the entire frequency band. For example, the PRBs belonging to the PUCCH resource may have an interlace structure. This operation may mean that the number of terminals FDMed in the entire frequency band is the same as the number of interlaces. When a small number of bits of information are transmitted by one terminal through the PUCCH, many terminals may be multiplexed in the entire frequency band. In particular, there is a need for a method in which PUCCHs (e.g., UCIs of different terminals) using the same interlace can be multiplexed. It may be preferable to apply a spreading code to a part of the PUCCH through which the UCI composed of 1 bit or more is transmitted.

In a proposed method, an OCC may be applied symbol by symbol in the time domain. In this case, the number z of symbols of the PUCCH may be the length of the OCC. To support this operation, the DM-RS may be preferably mapped to the same resource elements (REs) in the PRB. For example, the OCC may be a discrete Fourier transform (DFT) sequence or a Hadamard sequence. When z is expressed as an exponential power of 2, it may be preferable to apply the Hadamard sequence. Otherwise, it may be preferable to apply the DFT sequence.

Method of Multiplexing DM-RS and UCI in the Frequency Domain

The number of symbols constituting the PUCCH resource may be smaller than a preconfigured number (e.g., four). For example, the number of symbols constituting the PUCCH resource may be one or two. In this case, the PUCCH DM-RS may be multiplexed with the UCI (e.g., REs to which the encoded UCI is mapped) in the frequency domain. Here, the PUCCH DM-RS may be a DM-RS used for demodulation of the PUCCH (e.g., UCI). In one symbol belonging to the PUCCH resource, the number of REs to which the DM-RS is mapped (hereinafter referred to as 'DM-RS REs') among REs included in one PRB may be x, and the number of REs to which the UCI is mapped (Hereinafter, referred to as 'UCI REs') may be y (=12-x). Each of x and y may be a natural number. The UCI REs may be REs to which the encoded UCI is mapped.

In a proposed method, the OCC having the length of y may be applied to the UCI REs. As the OCC having the length of y is applied to the UCI REs, the number of PUCCHs multiplexed in the frequency domain may increase. That is, a multiplexing capability or multiplexing order may increase.

On the other hand, the OCC may be applied on a PRB basis. Since the interlace for the PUCCH includes discontinuous PRBs, it may be preferable for the OCC to be applied to one PRB. The reason is that when a spreading code is applied such that discontinuous PRBs are code-division-multiplexed with each other, due to frequency selective characteristics of a radio channel, frequency resources to which the spreading code is mapped may have different channel values. Therefore, the decoding performance of the spreading code may be degraded. The OCC may be a DFT sequence or a Hadamard sequence. When y is represented as an exponential power of 2, the Hadamard sequence may be applied.

Method of Multiplexing DM-RS and UCI in the Time Domain

When the number of symbols constituting the PUCCH resource is more than a preconfigured number (e.g., four), the PUCCH DM-RS may be multiplexed with the UCI (e.g., REs to which the encoded UCI is mapped) in the time domain. In this case, the OCC may be applied in the same manner as the above-described exemplary embodiments. The OCC may be applied within one PRB among PRBs constituting the PUCCH. The number of UCI REs included in one PRB may be twelve.

In a proposed method, the OCC having the length of 12 may be applied to the UCI REs. Therefore, the number of PUCCHs multiplexed in the time domain may increase. The OCC may be a DFT sequence or a Hadamard sequence. For example, a DFT sequence having the length of 12 may be applied.

Enhanced PUCCH Format 2

When the PUCCH format 2 is used in the NR communication system, four DM-RS REs and eight UCI REs may be allocated in one PRB. Thus, an OCC having a length of 8 may be applied to the UCI REs. For example, the OCC may be a Hadamard sequence or a DFT sequence.

In order to apply the OCC step by step, a recursively defined Hadamard sequence may be applied. A Hadamard sequence having a length of $2^{n+1}$ may be obtained by repeatedly adding a Hadamard sequence having a length of 2 to a Hadamard sequence having a length of $2^n$.

The Hadamard sequences may have indexes having various orders. These may be represented by a matrix. The index of the Hadamard sequence may be assigned according to the order of the column vectors of the matrix. Tables 2 to 4 below may show Hadamard sequences having different orders. In Tables 2 to 4, a horizontal axis may represent an RE index in a PRB, and in Tables 2 to 5, a vertical axis may represent an index of a sequence (e.g., Hadamard sequence). In Tables 2 to 4, '+1' and '−1' may mean a value of the Hadamard sequence.

Table 1 below may represent a matrix of Reed Muller codes. When the UCI is 1 bit in size, a codeword may be obtained by multiplying the Reed Muller code (e.g., generation matrix defined in Table 1) and a row vector (e.g., 11 information bits generated by appending zero(s) to information or information bits). According to this operation, a vector consisting of 32 1's (i.e., [1, 1, . . . , 1]) may be represented. The UCI may be spread by the Hadamard sequence, and the spread UCI may be mapped to all PRBs of the interlace for the PUCCH.

TABLE 1

|    | 0 | 1 | 2 | 3 | 4 | 5 | 6 | 7 | 8 | 9 | 10 |
|----|---|---|---|---|---|---|---|---|---|---|----|
| 0  | 1 | 1 | 0 | 0 | 0 | 0 | 0 | 0 | 0 | 0 | 1  |
| 1  | 1 | 1 | 1 | 0 | 0 | 0 | 0 | 0 | 0 | 1 | 1  |
| 2  | 1 | 0 | 0 | 1 | 0 | 0 | 1 | 0 | 1 | 1 | 1  |
| 3  | 1 | 0 | 1 | 1 | 0 | 0 | 0 | 0 | 1 | 0 | 1  |
| 4  | 1 | 1 | 1 | 1 | 0 | 0 | 0 | 1 | 0 | 0 | 1  |
| 5  | 1 | 1 | 0 | 0 | 1 | 0 | 1 | 1 | 1 | 0 | 1  |
| 6  | 1 | 0 | 1 | 0 | 1 | 0 | 1 | 0 | 1 | 1 | 1  |
| 7  | 1 | 0 | 0 | 1 | 1 | 0 | 0 | 1 | 1 | 0 | 1  |
| 8  | 1 | 1 | 0 | 1 | 1 | 0 | 0 | 1 | 0 | 1 | 1  |
| 9  | 1 | 0 | 1 | 1 | 1 | 0 | 1 | 0 | 0 | 1 | 1  |
| 10 | 1 | 0 | 1 | 0 | 0 | 1 | 1 | 1 | 0 | 1 | 1  |
| 11 | 1 | 1 | 1 | 0 | 0 | 1 | 1 | 0 | 1 | 0 | 1  |
| 12 | 1 | 0 | 0 | 1 | 0 | 1 | 0 | 1 | 1 | 1 | 1  |
| 13 | 1 | 1 | 0 | 1 | 0 | 1 | 0 | 1 | 0 | 1 | 1  |
| 14 | 1 | 0 | 0 | 0 | 1 | 1 | 0 | 1 | 0 | 0 | 1  |
| 15 | 1 | 1 | 0 | 0 | 1 | 1 | 1 | 1 | 0 | 1 | 1  |
| 16 | 1 | 1 | 1 | 0 | 1 | 1 | 1 | 0 | 0 | 1 | 0  |
| 17 | 1 | 0 | 0 | 1 | 1 | 1 | 0 | 0 | 1 | 0 | 0  |
| 18 | 1 | 1 | 0 | 1 | 1 | 1 | 1 | 0 | 0 | 0 | 0  |
| 19 | 1 | 0 | 0 | 0 | 0 | 1 | 1 | 0 | 0 | 0 | 0  |
| 20 | 1 | 0 | 1 | 0 | 0 | 0 | 1 | 0 | 0 | 0 | 1  |
| 21 | 1 | 1 | 0 | 1 | 0 | 0 | 0 | 0 | 1 | 1 | 1  |
| 22 | 1 | 0 | 0 | 0 | 1 | 0 | 0 | 1 | 1 | 0 | 1  |
| 23 | 1 | 1 | 1 | 0 | 1 | 0 | 0 | 0 | 1 | 1 | 1  |
| 24 | 1 | 1 | 1 | 1 | 1 | 0 | 1 | 1 | 1 | 1 | 0  |
| 25 | 1 | 1 | 0 | 0 | 0 | 1 | 1 | 1 | 0 | 0 | 1  |
| 26 | 1 | 0 | 1 | 1 | 0 | 1 | 0 | 0 | 1 | 1 | 0  |
| 27 | 1 | 1 | 1 | 1 | 0 | 1 | 0 | 1 | 1 | 1 | 0  |
| 28 | 1 | 0 | 1 | 0 | 1 | 1 | 1 | 0 | 0 | 0 | 0  |
| 29 | 1 | 0 | 1 | 1 | 1 | 1 | 1 | 1 | 1 | 0 | 0  |
| 30 | 1 | 1 | 1 | 1 | 1 | 1 | 1 | 1 | 1 | 1 | 1  |
| 31 | 1 | 0 | 0 | 0 | 0 | 0 | 0 | 0 | 0 | 0 | 0  |

TABLE 2

|   | 0 | 2 | 3 | 5 | 6 | 8 | 9 | 11 |
|---|---|---|---|---|---|---|---|----|
| 0 | +1 | +1 | +1 | +1 | +1 | +1 | +1 | +1 |
| 1 | +1 | +1 | +1 | +1 | −1 | −1 | −1 | −1 |
| 2 | +1 | +1 | −1 | −1 | −1 | −1 | +1 | +1 |
| 3 | +1 | +1 | −1 | −1 | +1 | +1 | −1 | −1 |
| 4 | +1 | −1 | −1 | +1 | +1 | −1 | −1 | +1 |
| 5 | +1 | −1 | −1 | +1 | −1 | +1 | +1 | −1 |
| 6 | +1 | −1 | +1 | −1 | −1 | +1 | −1 | +1 |
| 7 | +1 | −1 | +1 | −1 | +1 | −1 | +1 | −1 |

TABLE 3

|   | 0 | 2 | 3 | 5 | 6 | 8 | 9 | 11 |
|---|---|---|---|---|---|---|---|----|
| 0 | +1 | +1 | +1 | +1 | +1 | +1 | +1 | +1 |
| 1 | +1 | +1 | +1 | +1 | −1 | −1 | −1 | −1 |
| 2 | +1 | +1 | −1 | −1 | +1 | +1 | −1 | −1 |
| 3 | +1 | +1 | −1 | −1 | −1 | −1 | +1 | +1 |
| 4 | +1 | −1 | +1 | −1 | +1 | −1 | +1 | −1 |
| 5 | +1 | −1 | +1 | −1 | −1 | +1 | −1 | +1 |
| 6 | +1 | −1 | −1 | +1 | +1 | −1 | −1 | +1 |
| 7 | +1 | −1 | −1 | +1 | −1 | +1 | +1 | −1 |

TABLE 4

|   | 0 | 2 | 3 | 5 | 6 | 8 | 9 | 11 |
|---|---|---|---|---|---|---|---|----|
| 0 | +1 | +1 | +1 | +1 | +1 | +1 | +1 | +1 |
| 1 | +1 | −1 | +1 | −1 | +1 | −1 | +1 | −1 |
| 2 | +1 | +1 | −1 | −1 | +1 | +1 | −1 | −1 |
| 3 | +1 | −1 | −1 | +1 | +1 | −1 | −1 | +1 |
| 4 | +1 | +1 | +1 | +1 | −1 | −1 | −1 | −1 |
| 5 | +1 | −1 | +1 | −1 | −1 | +1 | −1 | +1 |
| 6 | +1 | +1 | −1 | −1 | −1 | −1 | +1 | +1 |
| 7 | +1 | −1 | −1 | +1 | −1 | +1 | +1 | −1 |

One or more OCC indexes among eight OCC indexes (e.g., indexes of the Hadamard sequences) may be used. The number of the one or more OCC indexes may be w, and w may be less than eight. In this case, w OCC indexes (e.g., 0, 1, . . . , w−1) defined in Table 4 may be used in order. This is because the OCC may be interpreted as an OCC subsequence based on adjacent REs (e.g., REs to which the OCC is to be applied). Since the DM-RS is mapped to REs 1, 4, 7, and 10 in a PRB, two UCI REs located between adjacent DM-RS REs may form a subsequence of the OCC. It may be preferable for subsequences of the OCC to form one OCC. Because of the nested characteristics of the OCC being established in stages, the above-described exemplary embodiments may be preferably used in a radio channel having a frequency selective characteristic.

Enhanced PUCCH Format 3

When the PUCCH format 3 is used in the NR communication system, 12 UCI REs may be allocated. Thus, an OCC having a length of 12 may be applied to the UCI REs. For example, the OCC may be a DFT sequence. The DFT sequence may be a column vector of a DFT matrix. Table 5 below may represent DFT sequences. A horizontal axis of Table 5 may represent an RE index in the PRB, and the vertical axis of Table 5 may represent an OCC index. In Table 5, w may be $e^{2\pi i/12}$.

TABLE 5

|    | 0 | 1 | 2 | 3 | 4 | 5 | 6 | 7 | 8 | 9 | 10 | 11 |
|----|---|---|---|---|---|---|---|---|---|---|----|----|
| 0  | $\omega^0$ | $\omega^0$ | $\omega^0$ | $\omega^0$ | $\omega^0$ | $\omega^0$ | $\omega^0$ | $\omega^0$ | $\omega^0$ | $\omega^0$ | $\omega^0$ | $\omega^0$ |
| 1  | $\omega^0$ | $\omega^1$ | $\omega^2$ | $\omega^3$ | $\omega^4$ | $\omega^5$ | $\omega^6$ | $\omega^7$ | $\omega^8$ | $\omega^9$ | $\omega^{10}$ | $\omega^{11}$ |
| 2  | $\omega^0$ | $\omega^2$ | $\omega^4$ | $\omega^6$ | $\omega^8$ | $\omega^{10}$ | $\omega^{12}$ | $\omega^{14}$ | $\omega^{16}$ | $\omega^{18}$ | $\omega^{20}$ | $\omega^{22}$ |
| 3  | $\omega^0$ | $\omega^3$ | $\omega^6$ | $\omega^9$ | $\omega^{12}$ | $\omega^{15}$ | $\omega^{18}$ | $\omega^{21}$ | $\omega^{24}$ | $\omega^{27}$ | $\omega^{30}$ | $\omega^{33}$ |
| 4  | $\omega^0$ | $\omega^4$ | $\omega^8$ | $\omega^{12}$ | $\omega^{16}$ | $\omega^{20}$ | $\omega^{24}$ | $\omega^{28}$ | $\omega^{32}$ | $\omega^{36}$ | $\omega^{40}$ | $\omega^{44}$ |
| 5  | $\omega^0$ | $\omega^5$ | $\omega^{10}$ | $\omega^{15}$ | $\omega^{20}$ | $\omega^{25}$ | $\omega^{30}$ | $\omega^{35}$ | $\omega^{40}$ | $\omega^{45}$ | $\omega^{50}$ | $\omega^{55}$ |
| 6  | $\omega^0$ | $\omega^6$ | $\omega^{12}$ | $\omega^{18}$ | $\omega^{24}$ | $\omega^{30}$ | $\omega^{36}$ | $\omega^{42}$ | $\omega^{48}$ | $\omega^{54}$ | $\omega^{60}$ | $\omega^{66}$ |
| 7  | $\omega^0$ | $\omega^7$ | $\omega^{14}$ | $\omega^{21}$ | $\omega^{28}$ | $\omega^{35}$ | $\omega^{42}$ | $\omega^{49}$ | $\omega^{56}$ | $\omega^{63}$ | $\omega^{70}$ | $\omega^{77}$ |
| 8  | $\omega^0$ | $\omega^8$ | $\omega^{16}$ | $\omega^{24}$ | $\omega^{32}$ | $\omega^{40}$ | $\omega^{48}$ | $\omega^{56}$ | $\omega^{64}$ | $\omega^{72}$ | $\omega^{80}$ | $\omega^{88}$ |
| 9  | $\omega^0$ | $\omega^9$ | $\omega^{18}$ | $\omega^{27}$ | $\omega^{36}$ | $\omega^{45}$ | $\omega^{54}$ | $\omega^{63}$ | $\omega^{72}$ | $\omega^{81}$ | $\omega^{90}$ | $\omega^{99}$ |
| 10 | $\omega^0$ | $\omega^{10}$ | $\omega^{20}$ | $\omega^{30}$ | $\omega^{40}$ | $\omega^{50}$ | $\omega^{60}$ | $\omega^{70}$ | $\omega^{80}$ | $\omega^{90}$ | $\omega^{100}$ | $\omega^{110}$ |
| 11 | $\omega^0$ | $\omega^{11}$ | $\omega^{22}$ | $\omega^{33}$ | $\omega^{44}$ | $\omega^{55}$ | $\omega^{66}$ | $\omega^{77}$ | $\omega^{88}$ | $\omega^{99}$ | $\omega^{110}$ | $\omega^{121}$ |

One or more OCC indexes among 12 OCC indexes may be used. The number of the one or more OCC indexes may be q, and q may be less than 12. In order to select q OCC indexes, α satisfying $(\omega^\alpha)^q=1$ may be selected. α may be preferably selected from Table 5. The reason is that the selected column vectors have a property of being orthogonal to each other. In addition, since arguments of complex values of the q-th roots of unity have a constant interval, the above-described exemplary embodiments may be preferably applied to a radio channel having a frequency selective characteristic.

HARQ Response Feedback Method in a Shared Spectrum

The PUCCH resource may include a PUCCH format, a frequency resource of the PUCCH, a time resource of the PUCCH, and a sequence resource for the PUCCH. When the size of the UCI is 3 bits or more, a Reed Muller code or a Polar code may be used in the encoding procedure of the UCI, and the encoded UCI may be mapped to the PUCCH. When the size of the UCI is 1 bit or 2 bits, a UCI having a size of 3 bits or more may be generated by appending a predefined bit(s) (e.g., '0') to the UCI in the encoding procedure of the UCI.

The PUCCH DM-RS may be TDMed or FDMed with a codeword of the UCI. For example, when the number of symbols constituting the PUCCH is small, the PUCCH DM-RS may be FDMed with the codeword of the UCI. Here, the number of symbols constituting the PUCCH may be one or two. When the number of symbols constituting the PUCCH is large, the PUCCH DM-RS may be TDMed with the codeword of the UCI. Here, the number of symbols constituting the PUCCH may be three or more.

The base station may transmit an RRC message including a resource set or a resource list of the PUCCH to the terminal. In addition, the base station may transmit DL-DCI including information (e.g., an index) indicating one or more resources belonging to the resource set or the resource list indicated by the RRC message to the terminal. Here, the DL-DCI may include resource allocation information of a PDSCH. The terminal may receive the RRC message from the base station, and may identify the resource set or the resource list of the PUCCH included in the RRC message. In addition, the terminal may receive the DL-DCI scheduling the PDSCH from the base station, and may identify the one or more resources indicated by the DL-DCI among the resources belonging to the resource set or the resource list of the PUCCH, and transmit a PUCCH to the base station by using the identified one or more resources.

The PUCCH resource may be fixed to one, and additional information may be needed to transmit the PUCCH. For example, when an HARQ response for the PDSCH is transmitted through the PUCCH, a slot corresponding to an HARQ-ACK feedback timing may be indicated by a slot offset. In addition, transmission of the PUCCH in a shared spectrum may be performed based on the trigger scheme.

In a proposed method, the DL-DCI scheduling the PDSCH may include other information (e.g., time resource information (e.g., slot offset) and trigger scheme for the PUCCH transmission). The size of the DL-DCI may be increased to include the other information. Since one DCI includes resource allocation information of one PDSCH and feedback information (e.g., configuration information of PUCCH) of the HARQ response for the PDSCH, the burden of the decoding procedure of the PDCCH may not increase.

In another proposed method, the other information (e.g., time resource information (e.g., slot offset) and trigger scheme for the PUCCH transmissions) may be included in another DCI (e.g., a common DCI or a UL-DCI scheduling the PUSCH) instead of the DL-DCI scheduling the PDSCH. The terminal may receive the UL-DCI including the other information. In this case, the terminal may transmit the HARQ response by using the PUSCH instead of the PUCCH. The DL-DCI may include resource allocation information of the PUCCH and may not include information indicating a trigger scheme of the PUCCH transmission and/or information indicating a channel access scheme of the PUCCH. Accordingly, the size of the DL-DCI may be reduced. In this case, the terminal receives two DCIs (e.g., DL-DCI scheduling the PDSCH, and UL-DCI including information for transmitting the HARQ response) to perform a reception operation of the PDSCH and an HARQ response transmission operation for the PDSCH. Therefore, the burden of the decoding procedure of the PDCCH may increase.

Method of Indicating PUCCH Transmission Using DL-DCI

The DL-DCI may include one or more of the following fields, and the DL-DCI including one or more fields may indicate PUCCH transmission.

Trigger Field for PUCCH

The DL-DCI may include a trigger field. The number of trigger fields may vary depending on the trigger scheme of the PUCCH. One trigger field (e.g., trigger A field) or two trigger fields (e.g., trigger A field and trigger B field) may be needed for triggering the PUCCH transmission. The trigger A field and the trigger B field may be included in different DL-DCIs.

The trigger A field included in the DL-DCI may indicate two different values. The terminal may determine whether to perform a monitoring operation of the trigger B field according to a value indicated by the trigger A field. The trigger A field set to a first value (e.g., '0') may indicate the non-trigger scheme. In this case, the terminal may transmit the PUCCH based on the DL-DCI. For example, the terminal may identify a slot in which the PUCCH can be transmitted based on the slot offset field included in the DL-DCI. The trigger A field set to a second value (e.g., '1') may indicate the trigger scheme. In this case, the terminal may receive an additional DCI (e.g., common DCI) that triggers the transmission of the PUCCH. The additional DCI may include the trigger B field. The terminal may identify a slot in which the PUCCH can be transmitted based on information element(s) (e.g., trigger B field) included in the additional DCI.

Slot Offset Field for PUCCH

The DL-DCI may include a slot offset field. The slot in which the HARQ response is transmitted may be indicated by the slot offset field included in the DL-DCI. For example, the terminal may determine a slot after an offset indicated by the slot offset field from the slot in which the PDSCH is received as a slot in which the PUCCH (e.g., PUCCH including the HARQ response) is transmitted. The terminal may perform the LBT operation and may not transmit the PUCCH in the slot indicated by the slot offset field when the channel is determined to be busy as a result of the LBT operation.

The slot offset field for the PUCCH may indicate an integer or a non-numerical value. When the slot offset field indicates an integer, the terminal may determine a slot after the value indicated by the slot offset field from the slot in which the PDSCH is received as the slot in which the PUCCH is transmitted. On the other hand, when the slot offset field indicates a non-numeric value, the terminal may not transmit the PUCCH when an additional indication (e.g., an additional DCI triggering one or more transmissions among HARQ codebook(s)) is not received from the base station.

HARQ-ACK Codebook Group Indicator

HARQ response bits indicated to be transmitted in the same PUCCH may be assumed to belong to the same HARQ codebook. The PUCCH transmitted in the unlicensed band may include one HARQ codebook. The HARQ codebook may be a bit sting composed of HARQ response bits, and one HARQ codebook may correspond to one PUCCH transmission. For convenience of description, an 'augmented HARQ codebook' or 'extended HARQ codebook' may be defined. Each of the augmented HARQ codebook or the extended HARQ codebook may include all HARQ response bits belonging to one or more HARQ codebook(s). The augmented HARQ codebook may mean the extended HARQ codebook. In the augmented HARQ codebook, the bit string may be arranged according to a preconfigured order between HARQ codebooks (e.g., HARQ response bits). The augmented HARQ codebook may consist of HARQ response bit(s), and the augmented HARQ codebook may be one type of HARQ codebook. One augmented HARQ codebook may correspond to one PUCCH transmission. The augmented HARQ codebook may be generated according to methods described below. In the following embodiments, the HARQ codebook may be the augmented HARQ codebook, the extended HARQ codebook, or a general HARQ codebook. The general HARQ codebook may be an HARQ codebook rather than the augmented HARQ codebook and the extended HARQ codebook.

The terminal may not transmit the PUCCH according to the result of the LBT operation. Therefore, the terminal may still have an HARQ codebook (e.g., HARQ response) that was not transmitted. The base station may not receive the PUCCH from the terminal. The base station may determine the reason of not detecting the PDCCH to be a case when the terminal does not receive the DL-DCI, a case when the terminal transmits the PUCCH but the base station does not correctly receive the PUCCH, or a case when the terminal does not transmit the PUCCH according to the result of the LBT operation.

The signaling overhead for the retransmission procedure for all HARQ processes associated with the HARQ codebook not received from the terminal may be large. Therefore, it may be preferable that the base station transmits to the terminal information instructing to perform the retransmission procedure of the HARQ codebook. The base station may transmit to the terminal DL-DCI including a field instructing to feed back the augmented HARQ codebook which is generated by multiplexing HARQ codebook(s) including a HARQ response for a PDSCH scheduled by the DL-DCI and a HARQ codebook (e.g., HARQ response) that may be failed to be transmitted. The size of the augmented HARQ codebook may be changed dynamically. For example, the size of the augmented HARQ codebook may be changed according to the number of HARQ response bits to be fed back to the base station. The HARQ codebook (e.g., each of the HARQ codebooks) constituting the augmented HARQ codebook may mean a group of PDSCHs associated with the corresponding HARQ codebook. The HARQ codebook including the HARQ response to the PDSCH scheduled by the DL-DCI may refer to one PDSCH group. PDSCHs corresponding to the HARQ response belonging to the HARQ codebook that may be failed to be transmitted may mean other PDSCH groups. Therefore, the codebook group field may be used as a field indicating the PDSCH group.

The DL-DCI may include a codebook group field, and the codebook group field may be an HARQ-ACK codebook group indicator. The codebook group field included in the DL-DCI may instruct to feed back the augmented HARQ codebook which is generated by multiplexing the HARQ codebook scheduled by previous DL-DCI (e.g., the HARQ codebook that may be failed to be transmitted) and the HARQ codebook (e.g., HARQ response) for the PDSCH scheduled by the corresponding DL-DCI. When the codebook group field has a first value, the terminal may multiplex the HARQ codebook (e.g., the HARQ codebook that includes the current HARQ response) associated with the current DL-DCI (e.g., DL-DCI including the codebook group field having the first value) and the previous HARQ codebook (e.g., the HARQ codebook that includes the previous HARQ response) that may be failed to be transmitted to generate the augmented HARQ codebook, perform an encoding operation on the augmented HARQ codebook, and map the encoded augmented HARQ codebooks to the PUCCH. On the other hand, when the codebook group field has a second value, the terminal may perform an encoding operation on the HARQ codebook associated with the current DL-DCI and may map the encoded HARQ codebook to the PUCCH. The augmented HARQ codebook may consist of only one HARQ codebook (e.g., one HARQ response bit). Even if there is a previous HARQ codebook (e.g., HARQ response bit) that is failed to be transmitted, the augmented HARQ codebook may not include the previous HARQ codebook (e.g., HARQ response bit) that is failed to be transmitted.

When the number of HARQ codebooks that may be failed to be transmitted is two or more, and the codebook group field has a first value, the terminal may generate one HARQ codebook including all HARQ codebook(s) that may be failed to be transmitted (e.g., HARQ response bit(s) associated with all the HARQ process(es) that may be failed to be transmitted). An arrangement order of the previous HARQ codebook(s) (e.g., HARQ response bit(s)) in the generated HARQ codebook may be the same as the existing arrangement order. The one HARQ codebook may be generated by concatenating the previous HARQ codebook(s) (e.g., the HARQ codebook(s) that may be failed to be transmitted). Alternatively, the one HARQ codebook may be generated by concatenating the HARQ response bits belonging to the previous HARQ codebook(s) (e.g., the HARQ codebook(s) that may be failed to be transmitted) in the order of HARQ process identifiers. The previous HARQ codebook(s) may be multiplexed with the HARQ codebook (e.g., HARQ codebook including the HARQ response to PDSCH allocated by the current DL-DCI) associated with the current DL-DCI to generate the augmented HARQ codebook, an encoding operation may be performed on the augmented HARQ codebook, and the encoded augmented HARQ codebook may be mapped to the PUCCH.

When the augmented HARQ codebook consists of the HARQ codebook(s) that may be failed to be transmitted, the size of the one HARQ codebook (e.g., the number of HARQ response bits) may be large. Accordingly, the base station may transmit to the terminal information instructing to retransmit some HARQ codebooks. To support this operation, a specific field may indicate various information.

The proposed new field (hereinafter referred to as 'HARQ indication field') may indicate one or more HARQ codebook(s) or HARQ process identifier(s) (e.g., HARQ process numbers or HARQ process IDs). The HARQ indication field may be included in a DL-DCI. The HARQ indication field may consist of a plurality of bits. One bit among the plurality of bits constituting the HARQ indication field may indicate one or more HARQ codebook(s), one or more HARQ codebook group(s), one or more HARQ process identifier(s), or one or more HARQ process identifier group(s).

The base station may transmit to the terminal an RRC message or a DCI including information indicating the above-described mapping relation (e.g., HARQ codebook, HARQ codebook group, HARQ process identifier, HARQ process identifier group mapped to the one bit belonging to the HARQ indication field). Alternatively, the base station may implicitly inform the terminal of the above-described mapping relation based on a relation (e.g., equation) defined in the technical specification without transmitting the separate RRC message.

Channel Access Information Filed for PUCCH

The DL-DCI may include a field for an information of channel access for the PUCCH transmission. The channel access information field may indicate the type of LBT operation performed for transmission of the PUCCH. The channel access information field set to a first value may indicate a first type of LBT operation. The channel access information field set to a second value may indicate a second type of LBT operation.

When the first type of LBT operation is used, the terminal may randomly select a backoff value within a contention window and perform a backoff operation based on the selected backoff value. The backoff value may be determined by the contention window, a random variable, and/or additional parameter(s). The additional parameter(s) may include a priority of the PUCCH (e.g., p=1). The size of the contention window may be determined according to the priority of the PUCCH. In addition, the additional parameter(s) may further include configuration information of a MCOT and/or the length Td of the defer duration.

The terminal may perform a channel sensing operation (e.g., energy detection operation) in a time duration (e.g., defer duration) corresponding to the selected backoff value, and may transmit the PUCCH when an energy detection result is less that the energy detection threshold in all sensing slots belonging to the defer duration. The sensing slot may have a length of 9 μs, and the sensing slot may be distinguished from a slot used for transmitting and receiving a signal.

When the second type of LBT operation is used, the terminal may perform a channel sensing operation (e.g., energy detection operation) in all sensing slots belonging to the defer duration without a random backoff operation. When an energy detection result is less than the energy detection threshold in all the sensing slots belonging to the defer duration, the terminal may transmit the PUCCH. Here, the length of the defer duration may be several tens of microseconds (e.g., 25 μs or 16 μs).

Meanwhile, the channel access information field may indicate three or more values (e.g., three or more types of LBT operation). For example, the channel access information field may indicate a first value, a second value, or a third value. The channel access information field set to the first value may indicate a first type of LBT operation. The channel access information field set to the second value may indicate a second type of LBT operation. The channel access information field set to the third value may indicate a third type of LBT operation.

When the third type of LBT operation is used, the terminal may perform a channel sensing operation (e.g., energy detection operation) in all sensing slots belonging to the defer duration without a random backoff operation. When an energy detection result is less than the energy detection threshold in all the sensing slots belonging to the defer duration, the terminal may transmit the PUCCH. Here, the length of the defer duration may be 16 μs. For example, the length of the defer duration for the third type of LBT operation may be 16 μs, and the length of the defer duration for the second type of LBT operation may be 25 μs.

The base station may transmit to the terminal information indicating the length of the defer duration to the terminal using higher layer signaling. The terminal may identify the length of the defer duration configured by the base station, and may perform the LBT operation (e.g., the second type of the LBT operation or the third type of the LBT operation) in the defer duration.

UL-DCI Indicating Transmission of an HARQ Response

Resource allocation information of a PUCCH through which an HARQ response for a PDSCH is transmitted may not be included in DL-DCI. In this case, the base station may transmit UL-DCI including a separate UL grant for feedback of the HARQ response to the terminal. The terminal may receive the UL-DCI from the base station, and may transmit the HARQ response to the base station through a PUSCH indicated by the UL grant included in the UL-DCI. The UL-DCI may include resource allocation information for transmission of other signals as well as the resource allocation information for transmission of the HARQ response. For example, the UL-DCI may further include resource allocation information for transmission of UCI (e.g., CSI reporting) and/or resource allocation information for transmission of a UL-SCH (e.g., transport block (TB)). The resource allocation information may be indicated by field(s) included in the UL-DCI.

Method of Explicitly Indicating a Transmission Resource of an HARQ Response

The UL-DCI may include an HARQ codebook trigger field, and the HARQ codebook trigger field may instruct the terminal to feed back an HARQ response. When the HARQ codebook trigger field is set to a first value, the terminal may generate one HARQ codebook including HARQ responses for all HARQ processes. The number of bits included in the HARQ codebook may be the same as the number of HARQ processes configured by higher layer signaling. When the HARQ codebook trigger field is set to a second value, the terminal may not map the HARQ response to a PUSCH.

Alternatively, the HARQ codebook trigger field included in the UL-DCI may consist of a plurality of bits. The HARQ codebook trigger field may indicate HARQ codebook(s) and/or HARQ process identifier(s). One bit belonging to the HARQ codebook trigger field may indicate that feedback of one or more HARQ codebooks, one or more HARQ codebook groups, one or more HARQ process identifiers, or one or more HARQ process identifier groups is requested. Another bit belonging to the HARQ codebook trigger field may instruct the terminal not to map the HARQ response to the PUSCH.

The base station may transmit to the terminal an RRC message indicating the above-described mapping relation (e.g., mapping relations between one bit and 'the HARQ codebook(s), HARQ codebook group(s), HARQ process identifier(s), or HARQ process identifier group(s)'). Alternatively, the terminal may identify the above-described mapping relation based on a relation (e.g., equation) defined in the technical specification without receiving the RRC message. A code block group transmission information (CBGTI) included in the UL-DCI may be used to indicate transmission of the HARQ response. In this case, the UL-DCI may not include resource allocation information of the UL-SCH and may include resource information of a PUSCH for a transmission of UCI (e.g., HARQ response, CSI).

Method of Implicitly Indicating a Transmission Resource of an HARQ Response

The UL-DCI may not include the field explicitly requesting transmission of an HARQ response (e.g., HARQ feedback). However, the transmission request of the HARQ response may be implicitly indicated by a combination of fields included in the UL-DCI.

In a proposed method, when the UL-DCI received from the base station does not include a field indicating a transmission resource of a UL-SCH, and a downlink assignment index (DAI) field included in the corresponding UL-DCI is set to a specific value (e.g., a value other than '00'), the terminal may determine that the corresponding UL-DCI requests the feedback of the HARQ response.

Alternatively, the terminal receiving the UL-DCI may interpret that the CBGTI for the UL-SCH indicates an index of the HARQ codebook group. This operation may be applied when CBG transmission is configured in the terminal by an RRC message. Alternatively, the terminal may interpret that the DAI field included in the UL-DCI indicates the index of the HARQ codebook group.

Method of Performing Feedback of an HARQ Response in Consideration of a New Feedback Indicator (NFI) and/or a New Data Indicator (NDI)

The terminal may not receive a PDCCH according to a result of the LBT operation at the base station due to characteristics of an unlicensed band. In addition, the terminal may not transmit the PUCCH according to a result of the LBT operation. Therefore, the number of bits of the HARQ response predicted by the base station may be different from the number of bits of the HARQ response transmitted by the terminal. To solve this problem, the DL-DCI may include an NFI for a PDSCH group (or HARQ codebook). The size of the NFI may be 1 bit. When the PUCCH is received from the terminal, the base station may change the value of the NFI for the HARQ codebook (or group identifier (GID)) included in the PUCCH to another value. When the value of the NFI received from the base station is changed, the terminal may determine that HARQ responses for all HARQ process identifiers (HPIDs) belonging to a GID associated with the corresponding NFI have been received at the base station.

The base station may transmit the NDI for the HARQ process to the terminal. The size of the NDI may be 1 bit. The terminal may receive the NDI from the base station, and may determine whether transmission of the DL-SCH associated with the NDI is initial transmission or retransmission. Accordingly, the terminal may determine whether to perform a soft combining operation in a decoding procedure of the DL-SCH. The base station may generate DCI including one or more of the DAI, NFI, NDI, and GID, and may transmit the generated DCI to the terminal. The terminal may receive the DCI from the base station, and may identify the information included in the DCI.

In a proposed method, the value of the HARQ response may be identified based on the NFI associated with the HARQ process. Here, the HARQ response may be NACK. Alternatively, the HARQ response may be ACK or NACK, which is a decoding result for the DL-SCH.

The terminal may know in advance the NFI and NDI for the HPID, and may receive the DL-DCI from the base station. The DL-DCI may be received at a time point t (e.g., slot t), and the terminal may compare each of the NFI and NDI included in the DL-DCI with each of the NFI and NDI which are already known. The terminal may identify whether each of the NFI and the NDI is changed based on the comparison result. For example, the terminal may compare each of NFI and NDI included in a DL-DCI received at a time point r before the time point t with the NFI and NDI included in the DL-DCI received at the time point t Here, the DL-DCI received at the time point r and the DL-DCI received at the time point t may have the same GID.

Meanwhile, the terminal may not know a reference value of the NFI. For example, when the base station initially transmits the DL-DCI for the HPID and the GID at the time point t (that is, there is no DL-DCI received before the time point t), the terminal may not know the reference value of the NFI. When it is determined that the NFI is changed, the terminal may know a GID x to which the HPID indicated by the DL-DCI received at the time point t (e.g., slot t) belongs last or the GID x at the time point t.

The DL-DCI received in the slot t may indicate that the corresponding HPID belongs to a GID y. x may be equal to y. Alternatively, x may be different from y. Regarding all HPIDs belonging to the GID x, it may be assumed that the terminal knows all HARQ responses transmitted at a time point s (e.g., s≠t) when the terminal transmits its HARQ response. The terminal may further transmit an HARQ response for the corresponding HPID in the slot t to the base station.

On the other hand, when the NFI included in the DL-DCI received at the time point t is the same as the NFI received before the time point t, the terminal may interpret that the base station has not successfully received the PUCCH associated with the corresponding GID at the time point s. The base station may not know HARQ responses of all HPIDs belonging to the corresponding GID. The terminal may transmit the HARQ response for the corresponding HPID to the base station at the time point t, and may also transmit HARQ response(s) for other HPID(s) belonging to the GID to the base station. The HARQ response(s) for other HPID (s) belonging to the corresponding GID may be transmitted at the time point t.

In a proposed method, the HARQ response to the HARQ process may be identified based on the NFI and the NDI. The HARQ response may be represented by NACK. Alternatively, the HARQ response may be represented by ACK or NACK.

The terminal may receive the DL-DCI at the time point t, and may identify the NFI and NDI based on the DL-DCI. The terminal may identify whether the NDI is changed by comparing the NDI included in the DL-DCI received at a time point (e.g., time point t−1) before the time point t and the NDI included in the DL-DCI received at the time point t Here, the HPID associated with the DL-DCI received at a time point before the time point t may be the same as the HPID associated with the DL-DCI received at the time point t. When the DL-DCI is not received before the time point t, the terminal may not know the reference value of the NDI. It may be difficult for the terminal to determine whether to perform a soft combining operation for the corresponding HPID.

Based on the DL-DCI received at the time point t, it may be identified that the NFI is changed and the NDI is not changed. In this case, the transmission operation of the DL-SCH may be meaningless. That is, the base station may change the NFI since the base station has received the HARQ response for the HPID, and it may be represented by the DL-DCI (e.g., the DL-DCI transmitted at the time point t) that the transmission resource for a new DL-SCH is not allocated. Therefore, the terminal may not need to transmit the HARQ response, and the base station may not need to receive the HARQ response.

However, in a case other than the case described above (e.g., when the NDI is changed regardless of the NFI or when the NFI and NDI do not change), the terminal may transmit the HARQ response for the DL-SCH associated with the corresponding HPID.

The above-described exemplary embodiments may be applied to when the DCI associated with the HPID is not received at the time point t or when the DCI associated with the HPID is received at a time point (e.g., time point t−1) before the time point t. The NFI for the HPID may be identified based on the DCI received at the time point t. This is because the HPID and the GID to which the HPID belongs (e.g., GID y) are indicated by the DL-DCI, and the NFI for the GID is indicated.

Based on the above description, the terminal may identify the change of the NFI for the GID to which the corresponding HPID belongs last or the GID to which the HPID currently belongs based on the DCI received at the time point t or a time point before the time t. The terminal may identify whether the NFI is changed at a time point e or a time point before the time point e. Here, it may be defined as 'e≤t'. In addition, the terminal may identify whether the NDI is changed at the point time e or a time point before the time point e. When the NDI is not changed, the terminal may determine that a new DL-SCH is not initially transmitted. The base station may not need to receive an HARQ response for the corresponding HPID. When the NDI is changed, the terminal may determine that a new DL-SCH is initially transmitted and may transmit the HARQ response for the corresponding HPID to the base station.

The time at which the HARQ response associated with the GID x to which the HPID belongs is transmitted may be referred to as s, and the time at which the DL-DCI including the changed NDI is received after the transmission of the HARQ response may be referred to as q. In this case, 's≤q≤t' may be defined. Regarding the GID x to which the HPID belongs, the time point when the change of the NFI is recognized may be referred to as e. In this case, 's≤e≤t' may be defined.

A case when the terminal feeds back the HARQ response to the HPID or a case when the terminal feeds back a predefined value (e.g., ACK or NACK) or an arbitrary value may be considered. When e is after s and q is after s, the terminal may feed back the HARQ response to the base station. Here, e may be equal to q. In cases other than the case described above, the terminal may feed back a NACK, a predefined value, or an arbitrary value to the base station. In a proposed method, the terminal may perform an encoding operation on the HARQ responses for all HPIDs configured by higher layer signaling regardless of the NFI and the NDI, and may transmit the encoded HARQ response to the base station.

On the other hand, when all DL-DCIs associated with all HPIDs belonging to the GID are not received from the base station, the terminal may not know whether the NFI is changed. This operation may be for a case when the DL-DCI for the GID is not transmitted from the base station or a case when the terminal fails to decode all the DL-DCIs for the GID. In this case, the terminal may not know that the NFI is changed. This case may rarely occur.

Information Included in DCI Indicating Transmission of an HARQ Response

In a proposed method, DCI (e.g., DL-DCI or UL-DCI) may include NFIs for all GIDs. The terminal may directly identify the NFI for the GID from the DCI. Therefore, the terminal may know the change of the NFI for an arbitrary HPID. When the NFI is changed, the terminal may observe the change of the NDI associated with the corresponding HPID. When the NDI is not changed, the terminal may not need to transmit the HARQ response for the corresponding HPID. Accordingly, the terminal may map a predefined value (e.g., NACK or ACK) or an arbitrary value to an uplink channel as the HARQ response for the corresponding HPID. The base station may not need to identify the HARQ response for the HPID.

In another proposed method, the DCI (e.g., DL-DCI or UL-DCI) may include only configuration information for transmission of the HARQ response. That is, the DCI may not include other information (e.g., NFI and/or NDI) than configuration information for transmission of the HARQ response.

HARQ Response and Additional Information in an HARQ Response Feedback Procedure

In a proposed method, the terminal may perform an encoding operation on HARQ responses (e.g., ACK, NACK) for all HPIDs configured by higher layer signaling, and may transmit the encoded HARQ responses to the base station.

For example, the base station may transmit an RRC message including configuration information of a type2 codebook and configuration information of a type3 codebook to the terminal. The terminal may receive the RRC message from the base station, and may identify the configuration information of the type 2 codebook and the configuration information of the type 3 codebook included in the RRC message. The type 2 codebook may be the above-described augmented HARQ codebook or extended HARQ codebook. The type 2 codebook may be an enhanced dynamic codebook. The type 2 codebook may include one or two HARQ response bits (e.g., HARQ codebooks). In the type 2 codebook, the HARQ response bits may be arranged according to the PDSCH order (e.g., combination of one or more of reception order, scheduling order, order of start symbol, and order of end symbol). For example, the HARQ response bits may be arranged first according to the order of time resources of the PDSCH, and then HARQ response bits may be arranged according to the order of frequency resources of the PDSCH.

The type 3 codebook may be a semi-static codebook. The type 3 codebook may include a plurality of HARQ response bits (e.g., HARQ codebooks). In addition, the type 3 codebook may further include NDIs as well as the plurality of HARQ response bits. In embodiments, the HARQ codebook including 'HARQ response bit and NDI' may mean the type 3 codebook. Alternatively, the HARQ codebook including the HARQ response bit without the NDI may be interpreted as the type 3 codebook. In the type 3 codebook, the plurality of HARQ response bits may be arranged according to the order of HARQ process numbers. For example, the plurality of HARQ response bits may be arranged first according to the order of HARQ process numbers, and then the plurality of HARQ response bits may be arranged according to the order of frequency resources of the PDSCH.

The base station may transmit the DL-DCI including a field triggering the type 3 codebook to the terminal. The size of the field that triggers the type 3 codebook may be 1 bit. When the field triggering the type 3 codebook is set to the first value, the corresponding field may trigger transmission of the type 3 codebook. When the field triggering the type 3 codebook is set to the second value, the corresponding field may not trigger the transmission of the type 3 codebook, but instead indicates the transmission of any indicated codebook such as the type 1 codebook or the type 2 codebook. That is, when the field triggering the type 3 codebook is set to the first value, the terminal may generate the type 3 codebook and transmit the type 3 codebook to the base station. When the field that triggers the type 3 codebook is set to the second value, the terminal may generate the type 1 or 2 codebook and transmit the type 1 or 2 codebook to the base station.

Meanwhile, when some of DL-DCIs are not received from the base station, the terminal may interpret bits of an HARQ response for a specific HARQ process as an existing value rather than a updated value because the terminal does not receive PDSCH. The terminal may not receive DL-DCI including a toggled NDI. Because the terminal has not received the PDSCH associated with the HARQ process indicated by the DL-DCI, the terminal may not be able to decode the TB. Therefore, the terminal may maintain a stored state of the HARQ response associated with the HARQ process indicated by the DL-DCI. That is, the state of the HARQ process known to the base station may be different from the state of the HARQ process known to the terminal.

Thereafter, the base station may transmit to the terminal information instructing to transmit HARQ responses (e.g., HARQ codebook(s)) for the configured all HARQ processes in a PUCCH or a PUSCH. In this case, the base station may misunderstand the HARQ response of the corresponding HARQ process. In order to solve this problem, in the feedback procedure of the HARQ response, the terminal may transmit additional information as well as the HARQ response to the base station.

In a proposed method, the NDI corresponding to the HPID may be transmitted together with the HARQ response. The HARQ process may correspond one-to-one with the NDI. The terminal may concatenate a bit sting of the last NDI for the corresponding HARQ process with a bit string of the HARQ response. Here, the bit sting of the HARQ response may be concatenated with the bit sting of the NDI. Alternatively, the bit sting of the HARQ response may be concatenated with the bit sting of the NDI, and the concatenated bit string s may be concatenated with the HPID. The terminal may perform an encoding operation on the concatenated bit strings and transmit the encoded bit strings to the base station.

In another proposed method, the terminal may transmit the NFI for each GID. The GID may mean the PDSCH group, and may correspond to the HARQ codebook index. For example, the terminal may concatenate the bit sting of the HARQ response and the bit string of the NFI. Here, the bit sting of the HARQ response may be concatenated with the bit sting of the NFI. Alternatively, with respect to the GID, the bit string of the NFI may be concatenated with the bit string of the HARQ response, and then the concatenated bit strings may be concatenated with the GID. The terminal may perform an encoding operation on the concatenated bit strings and transmit the encoded bit strings to the base station. The HARQ responses associated with some HARQ processes may be transmitted together with the NDI.

According to the above-described methods, the terminal may transmit the HARQ response and NDI associated with the HARQ process or the HARQ response associated with the HARQ process. The case when the HARQ responses associated with all HARQ processes are transmitted or the case when the HARQ responses and NDIs associated with all HARQ processes are transmitted may not be preferable. The reason is that there is a case in which the NDI toggle is hard to be applied to a specific HARQ process. For example, the base station may not transmit resource allocation information of the DL-SCH associated with the corresponding HARQ process. Alternatively, the base station may instruct the terminal to feed back the HARQ response at a timing when the HARQ response for the corresponding HARQ process cannot be processed (e.g., when a time corresponding to N1 symbols is not passed from the reception time point of the DL-SCH). In this case, since the terminal cannot derive a valid HARQ response, the base station may ignore the HARQ response for the corresponding HARQ process. The HARQ response and/or the NDI for the corresponding HARQ process may be unnecessary. When the characteristics of the HARQ process are shared between the base station and the terminal, unnecessary information may be omitted in the feedback procedure of the HARQ response.

In the feedback procedure of the HARQ response, the last PDSCH may be determined to correspond to an un-updated HARQ response bit (i.e., the HARQ response bit for the scheduled PDSCH before the last PDSCH) for a given HARQ process according to the processing capability (e.g., the time required to process the PDSCH, or N1 symbols indicated by the RRC signalling) of the terminal. Regarding the HARQ response bit for the given HARQ process corresponding to the last PDSCH and the PDSCH before the last PDSCH, the HARQ response bit may be transmitted to the base station together with the NDI. There may be some HARQ processes whose information such as an updated HARQ response bit and/or an updated NDI is not reflected to the HARQ codebook, and for those HARQ processes useful information may not be transmitted to the base station. In the generation procedure of the HARQ codebook, the terminal may fit the entire length of the HARQ codebook using a preconfigured value (e.g., NACK, '0') shared between the base station and the terminal.

Method of not Distinguishing Between Active and Inactive Carriers

Without discrimination between an activated carrier and a deactivated carrier, the terminal may feed back the HARQ response. A DCI, a MAC CE, or an expiration of a timer may indicate that the carrier is activated or deactivated, and the size of the HARQ codebook may be determined by an RRC signaling. Accordingly, the terminal may feed back the HARQ codebook (e.g., HARQ response) having the same size to the base station without depending on the DCI. In a specific carrier, the HARQ response may be transmitted together with the NDI. Therefore, the number of HARQ processes may be twice the number of existing HARQ processes.

Since the base station does not transmit a PDSCH on the deactivated carrier, the HARQ response and the NDI may not be useful values at the base station. Since the DCI, the MAC CE, or the expiration of the timer indicates that the carrier is activated or deactivated, and the size of the HARQ codebook is determined by an RRC signaling, the terminal may transmit NACK as the HARQ response on the deactivated carrier. The NDI may be set to a preconfigured value (e.g., '0') or to an arbitrary value.

Method of Distinguishing Between Active and Inactive Carriers

The activated carrier may be distinguished from the deactivated carrier and the HARQ response may be fed back. Since the base station does not perform a scheduling operation in the deactivated carrier, transmission of the HARQ response and the NDI may be unnecessary. Therefore, the size of the UCI in the deactivated carrier may be reduced.

In a proposed method, the terminal may feed back an HARQ response in the activated carrier. That is, the terminal may not generate an HARQ response in the deactivated carrier. HARQ responses may be generated for all HARQ processes. Alternatively, the HARQ response may be transmitted together with the NDI. That is, an HARQ response block (e.g., HARQ codebook) may include the HARQ response and the NDI. In the following embodiments, the HARQ response block may mean the HARQ codebook including the HARQ response bit and the NDI associated with the corresponding HARQ response bit. Here, an arrangement order and/or a concatenation order of the HARQ response and the NDI in the HARQ response block may be determined according to a preconfigured rule (e.g., scheduling order, order of the HARQ process identifier). The arrangement order and/or concatenation order of the HARQ response and the NDI in the HARQ response block may be shared in advance between the base station and the terminal. In this case, a signaling procedure for informing the arrangement order and/or concatenation order of the HARQ response and the NDI may be unnecessary.

In another proposed method, the terminal may generate an HARQ response block including the HARQ response and the NDI in an activated carrier. The terminal may generate an HARQ response block including only an HARQ response in a deactivated carrier. Here, the arrangement order and/or the concatenation order of the HARQ response and the NDI in the HARQ response block may be determined according to a pre configured rule. The arrangement order and/or the concatenation order of the HARQ response and the NDI in the HARQ response block may be shared in advance between the base station and the terminal. In this case, signaling for informing the arrangement order and/or the concatenation order of the HARQ response and the NDI may be unnecessary. The terminal may reduce the size of each HARQ response and NDI included in the HARQ response block. Thus, a polar coding rate may be reduced, and an error rate at the base station may be reduced.

Method of Generating an HARQ Response

The following embodiments may be applied to the type 3 codebook. That is, in the following embodiments, the HARQ codebook may mean the type 3 codebook. A DCI scheduling a PDSCH or a PUSCH may include information instructing to transmit HARQ responses for all HARQ processes. The terminal may map HARQ responses (e.g., HARQ codebooks or HARQ response bits) for all HARQ processes to an uplink channel in all carriers configured by an RRC signaling. The HARQ responses for all HARQ processes may be arranged in a preconfigured order (e.g., scheduling order or order of the HARQ process identifier). For example, in the HARQ codebook, the HARQ response bits may be arranged according to the scheduling order of the data channel (e.g., PDSCH) associated with the corresponding HARQ response bits.

Method of Generating an HARQ Response (e.g., HARQ Codebook) in a Preconfigured Carrier The following embodiments may be applied to the type 3 codebook. That is, in the following embodiments, the HARQ codebook may mean the type 3 codebook. The size of the HARQ codebook may be configured by an RRC signaling. According to a time domain resource allocation (TDRA) index and K1 configured by an RRC signaling, an arrangement order of bits in the HARQ codebook may be according to an assignment order of PDSCHs. The size of the HARQ codebook may be independent of the number of HARQ processes. The number of HARQ processes may be greater than the number of bits in the HARQ codebook. According to the conventional method, it may be difficult to arrange bits of the HARQ responses for all HARQ processes in one HARQ codebook within a preconfigured carrier.

In a proposed method, the terminal may generate the HARQ codebook by arranging the HARQ responses according to HARQ process identifier (e.g., HARQ process numbers (HPNs), HPIDs) in the preconfigured carrier. For example, when there are x HARQ processes, x HARQ response bits may be arranged in the HARQ codebook in the order of the x HARQ processes. This operation may be independent of the TDRA index configured in the terminal.

The base station may transmit to the terminal information instructing to generate a separate HARQ codebook having a semi-static size. In this case, methods for generating the HARQ codebook may be different. Even when the HARQ codebook is simply generated according to the above-described methods, the HARQ codebook may be generated according to two or more schemes.

The HARQ codebook may be generated in one scheme. One HARQ codebook may include two or more HARQ partial codebooks. The HARQ partial codebooks may have characteristics according to the conventional scheme (e.g., characteristics determined by the TDRA). When the transmission time point K1 of the HARQ codebook is a non-numerical value for the HARQ process, a maximum of 1 bit may be added to the HARQ codebook.

In a proposed method, the terminal may concatenate the HARQ partial codebooks in a preconfigured carrier. When there are HARQ process(es) not belonging to the HARQ partial codebook, the terminal may generate an HARQ codebook including the concatenated HARQ partial codebooks and bit(s) preconfigured for the corresponding HARQ process(es). Here, the HARQ partial codebooks included in the HARQ codebook may be generated based on the conventional scheme.

For example, the number of HARQ processes may be x, and the number of HARQ partial codebooks may be two or more. One HARQ process may not necessarily belong to a specific HARQ partial codebook. The size of the HARQ partial codebook may be determined based on the TDRA and additional bit(s) (e.g., '0' or '1') indicated by higher layer signaling. Therefore, the base station and the terminal may know the size of each of the HARQ partial codebooks. The HARQ codebook may include the concatenated HARQ partial codebooks. The HARQ codebook may also include HARQ responses useful at the base station. Even when there are HARQ process(es) not belonging to the HARQ partial codebook, the terminal may generate the HARQ codebook according to the number of all HARQ processes. Accordingly, the terminal may append a value(s) (e.g., NACK) preconfigured between the base station and the terminal to the HARQ codebook.

When carrier aggregation is configured, the base station may activate and deactivate specific carrier(s). The carrier may have one or more bandwidth parts (BWPs). The base station may activate one BWP among the one or more BWPs. In the active BWP, the TDRA may be determined by an RRC signaling. According to the conventional scheme, one BWP (e.g., firstActiveDownlinkBWP) among the BWPs may be a reference to generate the HARQ codebook including the HARQ response in the deactivated carrier.

In a proposed method, when the carrier is deactivated, the HARQ responses may be arranged in the order of the HARQ process identifier (e.g., HARQ process IDs or HARQ process numbers) irrespective of the BWP (e.g., regardless of the TDRA). The base station may not assign a PDSCH in the deactivated carrier. Therefore, the HARQ codebook may include only NACK. In a proposed method, the terminal may generate an HARQ response block including HARQ response(s) and NDI(s) in all carriers, and may map the HARQ response block to a PUCCH or a PUSCH.

In another proposed method, the terminal may generate an HARQ response block including an HARQ response and an NDI in an activated carrier, and the terminal may generate an HARQ response block including only an HARQ response (e.g., NACK) in a deactivated carrier. That is, the HARQ response block in the deactivated carrier may not include the NDI.

Method of Arranging NDIs and HARQ Responses

The following embodiments may be applied to the type 3 codebook. That is, in the following embodiments, the HARQ codebook may mean the type 3 codebook. An arrangement order of bit strings of HARQ responses in a carrier may be determined. The terminal may generate an HARQ codebook by concatenating bit strings of HARQ responses based on an order of carriers (e.g., serving cell indexes).

In a proposed method, a bit sting of HARQ responses and a bit sting of NDIs may be generated for each carrier, and the terminal may generate an HARQ codebook by concatenating the bit string of the HARQ responses with the bit string of the NDIs. For the arrangement of the HARQ responses and the NDIs, a conventional HARQ codebook generation scheme or an arrangement scheme according to HPNs may be used. This operation may also be applied to a carrier in which the NDI is not used. For example, the terminal may generate an HARQ codebook based on a scheme described in Table 6 below.

TABLE 6

| | |
|---|---|
| 1. | For CC index = 0, 1, 2, . . . |
| A. | Generate a bit string of HARQ responses |
| B. | Generate a bit string of NDIs |

TABLE 6-continued

| | |
|---|---|
| C. | Concatenate the bit string of HARQ responses with the bit string of NDIs |
| 2. | Concatenate the bit strings obtained for the respective CCs |

Alternatively, the terminal may generate an HARQ codebook based on a scheme described in Table 7 below. A generation scheme of an HARQ codebook in an activated carrier may be different from a generation scheme of an HARQ codebook in a deactivated carrier.

TABLE 7

| | |
|---|---|
| 1. | For CC index = 0, 1, 2, . . . |
| A. | Generate a bit string of HARQ responses |
| B. | Generate a bit string of NDIs for an activated carrier, and omit generation of a bit string of NDIs for an deactivated carrier |
| C. | Concatenate the bit string of HARQ responses with the bit string of NDIs |
| 2. | Concatenate the bit strings obtained for the respective CCs |

In another proposed method, the HARQ response and the NDI for the HARQ process may be configured in a bit pair. [HARQ response, NDI], which is a bit pair in a carrier, may be arranged according to the conventional HARQ codebook generation scheme or the arrangement scheme according to HPNs. That is, the conventional HARQ codebook generation scheme or arrangement scheme according to HPNs may be applied on a bit pair basis. This operation may be applied to a method of generating an HARQ response block including HARQ responses and NDIs for all HARQ processes. For example, the terminal may generate the HARQ codebook based on a scheme described in Table 8 below. In a deactivated carrier, the HARQ response block may consist of only HARQ responses instead of bit pairs.

TABLE 8

| | |
|---|---|
| 1. | For CC index = 0, 1, 2, . . . |
| A. | Generate a bit string of [HARQ response, NDI]s |
| 2. | Concatenate the bit strings obtained for the respective CCs |

Alternatively, the terminal may generate an HARQ codebook based on a scheme described in Table 9 below. A generation scheme of an HARQ codebook in an activated carrier may be different from a generation scheme of an HARQ codebook in a deactivated carrier.

TABLE 9

| | |
|---|---|
| 1. | For CC index = 0, 1, 2, . . . |
| A. | Generate a bit string of [HARQ response, NDI]s for an activated carrier, and generate a bit string of HARQ responses for a deactivated carrier |
| 2. | Concatenate the bit strings obtained for the respective CCs |

In another proposed method, bit strings of HARQ responses for all carriers may be arranged and bit strings of NDIs for all carriers may be arranged. Thereafter, the bit sting s of the HARQ responses may be concatenated with the bit strings of the NDIs. This operation may be performed according to the conventional HARQ codebook generation scheme or the conventional arrangement scheme according to HPNs. The conventional HARQ codebook generation scheme or the conventional arrangement scheme according to HPNs may also be applied to a carrier in which NDI is omitted. For example, the terminal may generate an HARQ codebook based on a scheme described in Table 10 below.

TABLE 10

| | |
|---|---|
| 1. | For CC index = 0, 1, 2, . . . |
| A. | Generate a bit string of HARQ responses |
| 2. | Concatenate the bit strings of the HARQ responses obtained for the respective CCs |
| 3. | For CC index = 0, 1, 2, . . . |
| A. | Generate a bit string of NDIs |
| 4. | Concatenate the bit strings of the NDIs obtained for the respective CCs |
| 5. | Concatenate the bit strings of the HARQ responses with the bit strings of the NDIs |

For example, the terminal may generate an HARQ codebook based on a scheme described in Table 11 below.

TABLE 11

| | |
|---|---|
| 1. | For CC index = 0, 1, 2, . . . |
| A. | Generate a bit string of HARQ responses |
| 2. | Concatenate the bit strings of HARQ responses obtained for the respective CCs |
| 3. | For CC index = 0, 1, 2, . . . |
| B. | Generate a bit string of NDIs for an activated carrier |
| 4. | Concatenate the bit strings of the NDIs obtained for the respective CCs |
| 5. | Concatenate the bit strings of the HARQ responses with the bit strings of the NDIs |

UL-DCI Indicating PUCCH Transmission The UL-DCI may include a field indicating PUCCH transmission. The terminal may transmit UCI (e.g., CSI or HARQ response) on a PUCCH based on the field included in the UL-DCI.

The UL-DCI may include a field indicating CSI reporting (hereinafter, referred to as 'CSI report field'). The CSI report field may consist of one or more bits. One bit included in the CSI report field may correspond to one or more CSI reports. One CSI report may be a combination of one or more of channel quality information (CQI), precoding matrix indicator (PMI), CSI-RS resource indicator (CRI), SS/PBCH resource block indicator (SSBRI), layer indicator (LI), rank indicator (RI), and L1 reference signal received power (L1-RSRP).

The UL-DCI may include a field indicating a report of HARQ response (hereinafter, referred to as 'HARQ report field'). The HARQ report field may consist of one or more bits. One bit included in the HARQ report field may correspond to one or more HARQ codebooks (e.g., HARQ responses). One HARQ codebook may consist of one or more HARQ response bits. The base station and the terminal may know in advance a mapping relation between the HARQ response bit(s) included in the HARQ codebook and the HARQ process identifier.

Upon receiving the UL-DCI, the terminal may identify transmission resources of a PUSCH based on the information elements included in the corresponding UL-DCI, and may determine whether to multiplex the UCI and a UL-SCH. The terminal may transmit the UCI and the UL-SCH using a single channel (e.g., PUSCH) by multiplexing the UCI with the UL-SCH. When the UCI is not multiplexed with the UL-SCH, the terminal may transmit the UCI on a PUCCH and may transmit the UL-SCH on a PUSCH. Here, the PUCCH and the PUSCH may be located in the same symbol, and a frequency resource of the PUCCH may be different from a frequency resource of the PUSCH. Therefore, a power backoff applied to a power amplifier of the terminal may increase, and thus an uplink coverage may decrease.

In order to satisfy the frequency regulation in the communication system operating in a shared spectrum, each of the PUSCH and the PUCCH may be configured in form of an interlace. This operation may mean that the PUSCH is multiplexed with the PUCCH in the frequency domain. Also in this case, a power backoff may be required in the power amplifier of the terminal. In a shared spectrum, a channel to which the UCI is mapped may be different from a channel to which the UL-SCH is mapped. The UCI may be transmitted on a PUCCH and the UL-SCH may be transmitted on a PUSCH.

UL-DCI Including a PUCCH Resource Index (PRI)

The UL-DCI may include a field indicating a PRI (hereinafter, referred to as 'PRI field'). When the UCI consists of 1 bit or 2 bits, a PUCCH resource may be determined by an index of a CCE to which the UL-DCI is mapped as well as the PRI indicated by the UL-DCI. When the UCI is configured with three or more bits, the PUCCH resource may be determined based on the number of bits of the UCI and the PRI indicated by the UL-DCI. Here, the PUCCH resource may be symbol(s) occupied by the PUCCH in a slot of the time domain. The slot in which the PUCCH is transmitted may mean a slot indicated by the resource allocation information of the PUSCH included in the UL-DCI.

An MCS level applied to the UCI may vary depending on the size of the UCI. Since a channel encoding scheme varies according to the size of the UCI, the MCS level applied to the UCI may vary. When the size of the UCI is less than 3 bits, a first MCS level may be applied to the UCI. When the size of the UCI is 3 bits or more and less than 12 bits, a second MCS level may be applied to the UCI. When the size of the UCI is 12 bits or more, a third MCS level may be applied to the UCI.

The base station may configured the MCS level applied to the UCI to the terminal using higher layer signaling. Accordingly, the terminal may map the UCI to the PUCCH using the MCS level configured by higher layer signaling. Alternatively, the base station may transmit UL-DCI including information indicating the MCS level applied to the UL-SCH to the terminal. The terminal may derive the MCS level applied to the UCI by applying an offset to the MCS level indicated by the UL-DCI. Here, the offset may be indicated by the corresponding UL-DCI. Alternatively, the offset may be configured by higher layer signaling. The offset applied to the MCS level in the NR communication system may be different for each type of UCI. For example, the offset may be defined as betaOffsetACK, betaOffsetCSI-Part1, or betaOffsetCSI-Part2 according to the type of UCI.

Meanwhile, UL-DCI may include a UL-SCH indicator, and the UL-SCH indicator may indicate whether the UL-SCH is mapped to the PUSCH. When the UL-SCH indicator indicates that the UL-SCH is not mapped to the PUSCH, the terminal may transmit only the PUCCH. On the other hand, when the UL-SCH indicator indicates that the UL-SCH is mapped to the PUSCH, the terminal may transmit the PUSCH and the PUCCH in the same slot. The time resource of the PUCCH indicated by the PRI may overlap with the time resource of the PUSCH indicated by the UL-DCI. Alternatively, the time resource of the PUCCH indicated by the PRI may not overlap with the time resource of the PUSCH indicated by the UL-DCI.

When the time resource of the PUCCH overlaps with the time resource of the PUSCH, the base station may configure the frequency resource of the PUCCH to be different from the frequency resource of the PUSCH, and may transmit frequency resource information of each of the PUCCH and the PUSCH to the terminal. That is, the frequency resource indicated by the frequency resource information of the PUCCH may be different from the frequency resource indicated by the frequency resource information of the PUSCH. An LBT subband in which the PUCCH is transmitted may be included in an LBT subband(s) in which the PUSCH is transmitted. Frequency resources corresponding to the interlace of the PUCCH in the LBT subband in which the PUCCH is transmitted may be different from frequency resources corresponding to the interlace of the PUSCH.

It may be defined in the technical specification that the operation of transmitting only the PUCCH based on the UL-DCI is not supported. When the UL-DCI indicates not to map the UL-SCH to the PUSCH, the terminal may ignore the PRI field included in the corresponding UL-DCI.

Method of Transmitting UCI when Multiple PUSCHs are Assigned

The base station may transmit one UL-DCI including resource allocation information of two or more UL-SCHs (e.g., PUSCHs) to the terminal. This operation may be performed when there is a lot of UL data in the terminal. According to this operation, a transmission success probability of UL data may increase.

A format of the UL-DCI including resource allocation information of a plurality of PUSCHs may be distinguished from a format of the UL-DCI including resource allocation information of one PUSCH. The base station may inform the terminal of the format of the UL-DCI including the resource allocation information of a plurality of PUSCHs and/or the format of the UL-DCI including the resource allocation information of one PUSCH using higher layer signaling. According to the configuration of the base station, the terminal may perform a search operation for two or more UL-DCI formats in one search space. In this case, one or more UL-DCIs may be mapped to the same search space.

In a PUSCH assignment procedure, the base station may transmit information indicating multiplexing of the UCI (e.g., CSI or HARQ response) and the UL-SCH to the terminal. Alternatively, in the assignment procedure of the PUSCH, the base station may transmit to the terminal information instructing to transmit the UCI (e.g., CSI or HARQ response) in the PUCCH and to transmit the UL-SCH in the PUSCH. Here, the PUCCH and the PUSCH may be FDMed in the same symbol.

The base station may transmit position information of the PUSCH in which the UCI is multiplexed with the UL-SCH (e.g., the k-th PUSCH among the plurality of PUSCHs allocated by the UL-DCI) to the terminal. Alternatively, the position information of the PUSCH in which the UCI is multiplexed with the UL-SCH may be defined in the technical standard. k may be a natural number.

Regardless of the type of the UCI, a field indicating the position information of the PUSCH in which the UCI is multiplexed with the UL-SCH may be included in the UL-DCL Alternatively, the field indicating the position information of the PUSCH in which the UCI is multiplexed with the UL-SCH may be configured differently according to the type of the corresponding UCI. For example, the PUSCH to which the HARQ response is mapped may be different from the PUSCH to which the CSI is mapped. In this case, the UL-DCI may include a field indicating a time resource of an HARQ response (e.g., a PUSCH to which the HARQ response is mapped) and a field indicating a time resource of the CSI (e.g., a PUSCH to which the CSI is mapped). The field indicating the time resource of the HARQ response may be distinguished from the field indicating the time resource of the CSI.

Method for the Base Station to Inform a Time Resource to which UCI is Mapped

In a proposed method, UL-DCI may include a field (hereinafter, referred to as 'UCI mapping indication field) indicating position information of a PUSCH (e.g., the k-th PUSCH among the plurality of PUSCHs allocated by the UL-DCI) to which the UCI (e.g., HARQ response and/or CSI) is mapped. The UCI mapping indication field may be an index indicating a PUSCH. For example, when the UL-DCI assigns k PUSCHs, the size of the UCI mapping indication field included in the corresponding UL-DCI may be $\lceil \log_2 (k) \rceil$ bits. When a specific field included in the UL-DCI triggers a mapping operation of the UCI, the terminal may identify the PUSCH in which the UCI is multiplexed based on a combination of the specific field included in the UL-DCI and the field indicating the time resource to which the UCI is mapped. When the specific field included in the UL-DCI does not trigger the mapping operation of the UCI, the terminal may ignore the field indicating the time resource to which the UCI is mapped, which is included in the UL-DCI.

The above-described methods may be applied when the UCI is transmitted through the PUSCH as being multiplexed with the UL-SCH. The above-described methods may not be applied when the PUCCH to which the UCI is mapped is transmitted together with the PUSCH.

In a proposed method, the UL-DCI may indicate a slot to which the UCI is mapped.

The UCI may be transmitted on a PUCCH. A resource of the PUCCH may be indicated by the UL-DCI. For example, the PUCCH resource may be indicated by an explicit scheme or a combination of an explicit scheme and an implicit scheme. The above-described methods may not indicate the slot in which the PUCCH is transmitted. In this case, the slot in which the PUCCH is transmitted may be indicated by another method. In a proposed method, a specific field included in the UL-DCI may indicate the slot in which the PUCCH is transmitted. The slot in which the PUCCH is transmitted may be one of slot(s) to which the PUSCH(s) are allocated.

The PUSCH may occupy a few symbols. Therefore, even when the UL-DCI schedules k PUSCHs, the k PUSCHs may be mapped to k slots or less. The number of slots to which the k PUSCHs are mapped may be changed dynamically, and the size of the field of the UL-DCI may be changed. In order to indicate the slot in which the UCI is transmitted, a method of indicating a relative index of the slot may not be appropriate. Here, the relative index of the slot may indicate the slot in which the UCI (or PUCCH) is transmitted among the slots occupied by the PUSCHs. The base station may inform the terminal of the PUSCH in which the UCI is transmitted. In this case, the terminal may transmit the PUCCH based on a time resource derived from a PUCCH resource index in the slot occupied by the PUSCH indicated by the base station.

According to the above two methods, the terminal may determine whether to transmit the UCI based on a combination of two fields included in the UL-DCI. In addition, when it is determined that the UCI is transmitted, the terminal may determine the transmission time resource of the UCI based on a combination of two fields included in the UL-DCI. According to another method, the terminal may determine the transmission time resource of the UCI based on one field included in the UL-DCI. For example, the terminal may use a field indicating the time resource to which the UCI is mapped instead of the field triggering transmission of the UCI. The UL-DCI may include the field that triggers transmission of the UCI and the field indicating the time resource to which the UCI is mapped.

In a proposed method, the UL-DCI may include a field indicating one index, and the index may indicate both the triggering of the transmission of the UCI and the time resource to which the UCI is mapped.

According to the above-described method, the field necessary for indicating the UCI transmission may be reduced. Therefore, the size of the field required to indicate the UCI transmission in the UL-DCI may be reduced. For example, the index set to a first value may indicate that UCI transmission is not triggered, and the index set to another value may indicate that the UCI transmission is triggered and the position of the PUSCH in which the UCI is multiplexed. For example, when the UL-DCI schedules k PUSCHs, the size of the index included in the UL-DCI may be $\lceil \log_2 (1+k) \rceil$ bits.

The time resource to which the UCI is mapped may be determined based on the contents defined in the technical specification. In this case, the UL-DCI may not include the field indicating the transmission time point of the UCI. The UCI may be transmitted on a PUSCH specified in the technical specification. Therefore, the size of the UL-DCI may be reduced.

Method of Multiplexing UCI with UL-SCH

When the UL-DCI schedules transmission of two or more PUSCHs and the corresponding UL-DCI indicates that transmission of UCI is triggered, the terminal may map the UCI to a specific PUSCH. For example, when the UL-DCI schedules transmission of k PUSCHs (e.g., PUSCH #0, . . . , PUSCH #(k−1)), the terminal may map the UCI to the PUSCH #(k−1) or the PUSCH #(k−2). The terminal may transmit the PUSCH after performing the LBT operation. A probability that the LBT operation for each of the k PUSCHs succeeds may increase in a temporal order. This is because the terminal can transmit the next PUSCH of the current PUSCH when the terminal succeeds in the LBT operation for the current PUSCH. When the UL-DCI schedules transmission of k PUSCHs (e.g., PUSCH #0, . . . , PUSCH #(k−1)), a transmission probability of the PUSCH #(k−1) is the highest among the k PUSCHs.

In addition, when UL-DCI schedules transmission of k PUSCHs (e.g., PUSCH #0, . . . , PUSCH #(k−1)), a transmission probability of the PUSCH #0 is the lowest among the k PUSCHs. Therefore, the PUSCH #0 may have a short length. The terminal may perform the LBT operation from the slot in which the PUSCH #0 is located, and may start the PUSCH transmission when the LBT operation is successful. When the LBT operation fails, the PUSCH may not be transmitted. Accordingly, many symbols (e.g., many REs) may be allocated for the PUSCH #(k−1). Since rate matching is performed for the UL-SCH when the UCI is multiplexed with the UL-SCH, the UCI may be preferably mapped to the PUSCH #(k−1) having a relatively large size.

Meanwhile, the last PUSCH among the PUSCHs allocated by the base station may be multiplexed with a SRS in the time domain. The SRS may be transmitted after the last PUSCH. In this case, the PUSCH having the longest length among the PUSCHs allocated by the base station may not be the last PUSCH. That is, the length (e.g., the number of symbols) of the last PUSCH may be shorter than the length of the previous PUSCH of the last PUSCH. The UCI may be multiplexed with the UL-SCH in the previous PUSCH of the last PUSCH.

Method of Mapping UCI to a PUCCH

The base station may transmit UL-DCI directly or indirectly indicating a PUCCH resource to the terminal. The terminal may receive the UL-DCI from the base station, and may identify the PUCCH resource based on the UL-DCI. The slot in which the PUCCH is transmitted may be a slot in which a specific PUSCH defined in the technical standard is transmitted.

The slot in which the PUCCH is transmitted may be a slot having a high probability of success of the LBT operation performed in the terminal. When PUSCHs are allocated in a plurality of slots, the PUCCH transmission may not be performed in the first slot among the plurality of slots. The PUCCH transmission may be preferably performed in the last slot or the previous slot of the last slot among the plurality of slots. The terminal may determine one slot in which the PUCCH is transmitted based on the contents defined in the technical specification. The terminal may transmit the UCI to the base station using a PUCCH resource in the preconfigured slot.

Method of Configuring Resources for a PUCCH

The base station may transmit a resource set or a resource list of a PUCCH to the terminal using an RRC message (e.g., higher layer signaling). A time resource, frequency resource, and sequence resource for the PUCCH may be indicated by the following field(s). The terminal may derive a PUCCH resource based on one index included in a DCI received from the base station.

Time Resource of PUCCH

Start Symbol Field

The start symbol field may express a start symbol of the PUCCH or the start symbol and an end symbol of the PUCCH as one index. The terminal may identify the start symbol of the PUCCH and the number of symbols belonging to the PUCCH based on the index indicated by the start symbol field.

Length Field

The length field may express the number of symbols occupied by the PUCCH as one index.

Frequency Resource of PUCCH

Resource Block (RB) Allocation Fields

In order to satisfy the frequency regulation in an unlicensed band, the PUCCH may have a structure of an interlace present in the entire bandwidth. Therefore, the RB allocation field may imply an interlace index of the PUCCH.

Meanwhile, when one BWP (e.g., active BWP) is configured to span a plurality of LBT subbands, the PUCCH may be mapped in one of LBT subband. The base station may inform the terminal of the LBT subband to which the interlace of the PUCCH belongs as well as the interlace index of the PUCCH to indicate RB s to which the PUCCH is allocated. Accordingly, the RB allocation field may imply not only the interlace index of the PUCCH but also the index of the LBT subband (e.g., RB set) associated with the interlace.

Sequence Resource of PUCCH

PUCCH DM-RS Resource Field

The terminal may derive a DM-RS resource based on the PUCCH DM-RS resource field. When the PUCCH DM-RS is generated based on a Zadoff-Chu (ZC) sequence, the terminal may generate a ZC sequence based on a base sequence, and a cyclic shift may be applied to the generated ZC sequence. The base station may inform a cyclic shift to each of the terminals. The terminal may map the sequence to a resource grid defined based on a 'point A'.

When the PUCCH DM-RS is generated based on a pseudo random noise (PN) sequence, the terminal may initialize the PN sequence, and map the PN sequence (e.g., initialized PN sequence) to REs defined based on the point A. The terminal may know an initialization value of the PN sequence based on information indicated by a field received from the base station. For example, in the NR communication system, the base station may inform the terminal of a scrambling value (e.g., dataScramblingIdentityPUSCH) required for initialization of the PN sequence using higher layer signaling. Alternatively, the terminal may identify information necessary for the initialization of the PN sequence based on cell identification information (e.g., cell ID). The terminal may initialize the PN sequence based on a combination of information received from the base station (e.g., scrambling value, cell identification information) and terminal identification information (e.g., RNTI).

PUCCH OCC Field

When the size of the UCI transmitted on the PUCCH is 1 bit or 2 bits, the UCI may be spread based on an OCC in the frequency domain. In this case, the base station may transmit a PUCCH OCC field indicating an OCC index to each of the terminals.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving downlink control information (DCI) from a base station, the DCI including resource allocation information of a physical downlink shared channel (PDSCH);
performing a decoding operation of data #n in the PDSCH indicated by the DCI;
when the decoding operation for the data #n is not completed, generating a hybrid automatic repeat request (HARQ) codebook including a specific value instead of an HARQ response bit #n for the data #n and an HARQ response bit #n−1 for data #n−1 received from the base station before the data #n; and
transmitting the HARQ codebook to the base station,
wherein the specific value and the HARQ response bit #n are associated with a same HARQ process number, and the specific value and the HARQ response bit #n−1 are arranged in the HARQ codebook in an order of HARQ process numbers, and n is a natural number.

2. The operation method according to claim 1, wherein the HARQ codebook further includes a new data indicator (NDI) #n associated with the specific value and an NDI #n−1 associated with the HARQ response bit #n−1.

3. The operation method according to claim 2, wherein the specific value is concatenated with the NDI #n, the HARQ response bit #n−1 is concatenated with the NDI #n−1, and the concatenated specific value and NDI #n and the concatenated HARQ response bit #n−1 and NDI #n−1 are arranged in the HARQ codebook in the order of the HARQ process numbers.

4. The operation method according to claim 1, wherein the HARQ codebook includes HARQ response bits associated with all HARQ processes configured in the terminal or includes HARQ response bits generated by concatenating in an order of HARQ process identifiers and NDIs associated with the HARQ response bits.

5. The operation method according to claim 1, wherein the DCI further includes a field indicating whether transmission of the HARQ codebook is triggered.

6. The operation method according to claim 1, wherein the HARQ codebook is transmitted through a physical uplink control channel (PUCCH), and information indicating an index of a resource block (RB) set to which the PUCCH belongs and an interlace index of the PUCCH in the RB set is received from the base station.

7. The operation method according to claim 6, wherein the information indicating the index of the RB set and the interlace index is received from the base station through a radio resource control (RRC) message.

8. An operation method of a base station in a communication system, the operation method comprising:
transmitting downlink control information (DCI) to a terminal, the DCI including resource allocation information of a physical downlink shared channel (PDSCH) #n;
transmitting the PDSCH #n through resources indicated by the resource allocation information to the terminal; and
receiving a hybrid automatic repeat request (HARQ) codebook including a specific value instead of an HARQ response bit #n for the PDSCH #n and an HARQ response bit #n−1 for a PDSCH #n−1 when a decoding operation for the PDSCH #n is not completed in the terminal,
wherein the specific value and the HARQ response bit #n−1 are arranged in the HARQ codebook in an order of the PDSCH #n and the PDSCH #n−1, and n is a natural number.

9. The operation method according to claim 8, wherein the PDSCH #n and the PDSCH #n−1 belong to a same PDSCH group.

10. The operation method according to claim 8, wherein each of the PDSCH #n and the PDSCH #n−1 belongs to different PDSCH groups.

11. The operation method according to claim 8, wherein the DCI further includes a field indicating a number of PDSCH groups to be feedbacked, the field set as a first value indicating feedback of a HARQ response for one PDSCH group, and the field set as a second value indicating feedback of a HARQ response for a plurality of PDSCH groups.

12. The operation method according to claim 8, wherein the HARQ codebook is received through a physical uplink control channel (PUCCH), and information indicating one or more indices of a resource block (RB) set to which the PUCCH belongs and one or more interlace indices of the PUCCH in the RB set is transmitted to the terminal through higher layer signaling.

13. A terminal in a communication system, the terminal comprising:
a processor; and
a memory electronically communicating with the processor and storing instructions executable by the processor,
wherein when executed by the processor, the instructions cause the terminal to:
receive downlink control information (DCI) from a base station, the DCI including resource allocation information of a physical downlink shared channel (PDSCH);
perform a decoding operation of data #n in the PDSCH indicated by the DCI;
when the decoding operation for the data #n is not completed, generate a hybrid automatic repeat request (HARQ) codebook including a specific value instead of an HARQ response bit #n for the data #n and an HARQ response bit #n−1 for data #n−1 received from the base station before the data #n; and
transmit the HARQ codebook to the base station,
wherein the specific value and the HARQ response bit #n are associated with same HARQ process number, and the specific value and the HARQ response bit #n−1 are arranged in the HARQ codebook in an order of HARQ process numbers, and n is a natural number.

14. The terminal according to claim 13, wherein the HARQ codebook further includes a new data indicator (NDI) #n associated with the specific value and an NDI #n−1 associated with the HARQ response bit #n−1.

15. The terminal according to claim 14, wherein the specific value is concatenated with the NDI #n, the HARQ response bit #n−1 is concatenated with the NDI #n−1, and the concatenated specific value and NDI #n and the concatenated HARQ response bit #n−1 and NDI #n−1 are arranged in the HARQ codebook in the order of the HARQ process numbers.

16. The terminal according to claim 13, wherein the HARQ codebook includes HARQ response bits associated with all HARQ processes configured in the terminal or includes HARQ response bits generated by concatenating in an order of HARQ process identifiers and NDIs associated with the HARQ response bits.

17. The terminal according to claim 13, wherein the DCI further includes a field indicating whether transmission of the HARQ codebook is triggered.

18. The terminal according to claim 13, wherein the HARQ codebook is transmitted through a physical uplink control channel (PUCCH), and information indicating one or more indices of a resource block (RB) set to which the PUCCH belongs and one or more interlace indices of the PUCCH in the RB set is received from the base station.

* * * * *